(12) United States Patent
Frechette et al.

(10) Patent No.: US 7,487,641 B2
(45) Date of Patent: Feb. 10, 2009

(54) MICROFABRICATED RANKINE CYCLE STEAM TURBINE FOR POWER GENERATION AND METHODS OF MAKING THE SAME

(75) Inventors: Luc Frechette, Fleurimont (CA); Norbert Muller, Haslett, MI (US); Changgu Lee, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 499 days.

(21) Appl. No.: 10/988,974

(22) Filed: Nov. 15, 2004

(65) Prior Publication Data
US 2006/0010871 A1 Jan. 19, 2006

Related U.S. Application Data

(60) Provisional application No. 60/520,474, filed on Nov. 14, 2003.

(51) Int. Cl.
*F01K 7/34* (2006.01)
(52) U.S. Cl. .......................................... 60/653; 60/670
(58) Field of Classification Search .................. 60/645, 60/670, 653
See application file for complete search history.

(56) References Cited

U.S. PATENT DOCUMENTS 4,699,566 A * 10/1987 Miller ......................... 415/107
5,932,940 A 8/1999 Epstein et al.
6,392,313 B1 * 5/2002 Epstein et al. ................. 290/52
6,758,048 B1 * 7/2004 Ni .................................. 62/94
2006/0220388 A1 * 10/2006 Teets et al. ..................... 290/52

OTHER PUBLICATIONS

Cheng et al., "Localized Silicon Fusion and Eutectic Bonding for MEMS Fabrication and Packaging," Journal of Microelectromechical Systems, vol. 9, No. 1, Mar. 2000.
Epstein et al., "Macro Power from Micro Machinery", Science, 276, p. 1211, May 23, 1997.
Epstein et al., "Micro-Heat Engines, Gas Turbines, and Rocket Engines—the MIT Microengine Project," AIAA Paper 97-1773, 28th AIAA Fluid Dynamics Conference, Snowmass Village, CO. Jun. 29-Jul. 2, 1997.

(Continued)

*Primary Examiner*—Hoang M Nguyen
(74) *Attorney, Agent, or Firm*—Wilmer Cutler Pickering Hale and Dorr LLP

(57) ABSTRACT

In accordance with the present invention, an integrated micro steam turbine power plant on-a-chip has been provided. The integrated micro steam turbine power plant on-a-chip of the present invention comprises a miniature electric power generation system fabricated using silicon microfabrication technology and lithographic patterning. The present invention converts heat to electricity by implementing a thermodynamic power cycle on a chip. The steam turbine power plant on-a-chip generally comprises a turbine, a pump, an electric generator, an evaporator, and a condenser. The turbine is formed by a rotatable, disk-shaped rotor having a plurality of rotor blades disposed thereon and a plurality of stator blades. The plurality of stator blades are interdigitated with the plurality of rotor blades to form the turbine. The generator is driven by the turbine and converts mechanical energy into electrical energy.

41 Claims, 28 Drawing Sheets

OTHER PUBLICATIONS

Epstein et al., "Shirtbutton-sized Gas Turbines: The Engineering Chanllenges of Micro High Speed Rotating Machinery," Proc. 8th Int'l Symposium on Transport Phenomena and Dynamics of Rotating Machinery, Honolulu, Hawaii, Jan. 2000.

Frechette et al., "Demonstration of a Microfabricated High-Speed Turbine Supported on Gas Bearings," Tech. Digest, Solid-State Sensor and Actuator Workshop, pp. 1-5, Hilton Heasd Is., SC, Jun. 4-8, 2000.

Frechette et al., "An Electrostatic Induction Micromotor Supported on Gas-Lubricated Bearings," Proc. IEEE 14th Int'l Micro Electro Mechanical Systems Conf, Interlaken, Switzerland, pp. 1-4. Jan. 2001.

Fu et al., "Design and Fabrication of a Silicon-Based MEMS Rotary Engine," Proc. ASME Int'l Mech. Eng. Congress and Expo, New York, Nov. 11-16, 2001.

Hsing, "Analytical Solutions for Incompressible Spiral Groove Viscous Pumps," Journal of Lubrication Technology, vol. 96, No. 3, pp. 365-369. Jul. 1974.

Isomura et al., "Development of Microturbocharger and Microcombustor for a Three-Dimensinal Gas Turbine at Microscale," ASME Turbo Expo, Paper GT-2002-30580, Amsterdam, Netherlands, Jun. 3-6, 2002.

Kerrebrock, "Aircraft engine and gas turbines," 2nd Ed., MIT Press, Cambridge, MA, 1992.

Koo et al., "Modeling of two-phase microchannel heat sinks for VLSI chips," Proc. IEEE 14th Int'l Conf. on Micro Electro Mechanical Systems, pp. 422-426, Interlaken, Switzerland. Jun. 21-25, 2001.

Koser et al., "A High Torque Density mems Magnetic Induction Machine," Proc. 11th International Conf. on Solid-State Sensors and Actuators (Transducers), pp. 284-287, Munich, Germany. Jun. 10-14, 2001.

London et al., "High-Pressure Bipropellant Microrocket Engine," AIAA Journal of Propulsion and Power, vol. 17, No. 4, pp. 780-787. Jul-Aug. 2001.

Mehra et al., "A Six-Wafer Combustion System for a Silicon Micro Gas Turbine Engine," Journal of Microelectromechanical Systems, vol. 9, No. 4, pp. 517-527. Dec. 2000.

Mehra, "Computational Investigation and Design of Low Reynolds Number Micro-Turbomachinery," M.S. Thesis, Massachusetts Institute of Technology, Cambridge, MA. Jun. 1997.

Muller et al., "Optimization and Design Guidelines for High Flux Micro-Channel Heat Sinks for Liquid and Gaseous Single-Phase Flow," Proc. 8th Intersociety Conf. on Thermal and Thermomech. Phenomena in Elec. Systems (ITherm2002), pp. 449-456. 2002.

Mudawar, "Assessment of high-flux thermal management schemes," IEEE Transactions on Components and Packgaging Technologies., vol. 24, No. 2, pp. 122-141. Jun. 2001.

Muijderman, "Spiral Groove Bearings," Springer-Verlag, New York. 1966.

Nagle, "Analysis, Design, and Fabrication of an Electric Induction Micromotor for a Micro Gas-Turbine Generator," Ph.D. Thesis, Massachusetts Institute of Technology. Oct. 2000.

Nielsen et al., "A Thermophotovoltaic Micro-Generator for Portable Power Applications," Proc. Transducers'03, the 12th Int'l. Conf. on Solid State Sensors, Actuators and Microsystems, pp. 714-717, Boston, MA. Jun. 8-12, 2003.

Richards et al., "The P3 Micro Power Generation System," Proc. ASME Int'l Mech. Eng. Congress and Expo., vol. 369-4, pp. 425-435, New York, NY. Nov. 11-16, 2001.

Sato et al., "The Optimum Groove Geometry for Spiral Groove Viscous Pumps," ASME Journal of Tribology., vol. 112, pp. 409-414. Apr. 1990.

Schaevitz et al., "A Combustion-based MEMS Thermoelectric Power Generator," Proc. Transducers'01, 11th Int'l Conf. on Solid-State Sensors and Actuators, pp. 30-33, Munich, Germany. Jun. 10-14, 2001.

Toriyama et al., "Design of a Resonant Micro Reciprocating Engine for Power Generation," Proc. Tranducers'03, 12th Int'l. Conf. on Solid State Sensors and Microsystems, pp. 1303-1306, Boston, MA, Jun. 8-12, 2003.

Zhang et al., "Micro Combustion-Thermionic Power Generation: Feasibility, Design and Initial Results," Proc. Transducers'03, 12th Int'l Conf. on Solid State Sensors, Actuators and Microsystems, pp. 40-44, Boston, MA. Jun. 8-12, 2003.

Zhang et al., "Study of boiling regimes and transient signal measurements in microchannels," 11th International Conference on Solid-State Sensors and Actuators, pp. 1514-1517, Munich, Germany. Jun. 10-14, 2001.

* cited by examiner (a) Typical T-s diagram    (b) Schematic of system (a) T-s diagram for a condenser temperature of $T_{min}=10°C$, defined for in-flight operation (b) T-s diagram for a condenser temp. $T_{min}=93.5°C$, defined for in-cabin or ground operation (a) ground-based application ($T_{min}$ = 93.5°C)

(b) in-flight application ($T_{min}$ = 10°C)

Constant blade height over the entire radial extent (a)  (b)

(a) Power versus Blade height (b) Tip Vel. versus Blade height (a) power of each stage     (b) total turbine power (a) power of each stage     (b) total turbine power (a) power of each stage  (b) total turbine power (a) Circumferential cross section view (b) Plan view of spiral grooves (c) Rotor cross-section view (a) Low Pressure viscous pump (b) High Pressure viscous pump

*Size and properties:*
ρ (density of vapor at 400°C, 0.6MPa): 1.95 (kg/m$^3$)
μ (viscosity of vapor at 400°C, 0.6MPa): 25×10$^{-6}$ (Ns/m$^2$)
H: 300 μm
g1: 1 μm
g2: 10 μm
r1: 340 μm
r2: 348 μm
r3: 750 μm
r4: 760 μm

*Size and properties:*
$\rho$ (density of liquid at 120°C, 0.6MPa): 943 (kg/m³)
$\mu$ (viscosity of liquid at 120°C, 0.6MPa): 228×10⁻⁶ (Ns/m²)
r6: 280 μm
r7: 340 μm
g: 0.8 μm

MICROFABRICATED RANKINE CYCLE STEAM TURBINE FOR POWER GENERATION AND METHODS OF MAKING THE SAME

CROSS REFERENCE TO RELATED APPLICATION

This application claims the benefit under 35 U.S.C. § 119(e) of U.S. Provisional Patent Application No. 60/520,474, filed Nov. 14, 2003, which is hereby incorporated by reference herein in its entirety.

STATEMENT REGARDING FEDERALLY SPONSORED RESEARCH OR DEVELOPMENT

The government may have certain rights in the present invention pursuant to grants from the NASA Glenn Research Center, Contract Nos. NAS3-02118 and NAS3-03105.

FIELD OF THE INVENTION

The present invention generally relates to thermodynamic microsystems. More particularly, the present invention relates to microelectromechanical systems (MEMS) for power generation and methods of making the same.

BACKGROUND OF THE INVENTION

The advent of MEMS technology has opened the door to the creation of power systems at unprecedented small scales. Using silicon microfabrication processes, it has been suggested that common power generation systems could be miniaturized yielding high-power density, low-cost, batch manufactured power sources. Such power sources could provide alternatives to today's batteries, with potentially higher energy densities since they could extract energy from hydrocarbon fuels. These compact and efficient power systems are becoming increasingly important for a wide range of applications, such as powering of portable electronics as well as many other applications. Typically, such applications optimally require power sources that are characterized by high power and energy density, yet have minimal size and weight, and must be cost effective.

Since the mid-1990's, development efforts have been initiated to create MEMS-based heat engines, such as gas turbine engines, internal combustion engines (rotary Wankel or piston), and thermal-expansion-actuated piezoelectric power generators. These microengines convert thermal energy (from combustion of a fuel or another heat source), sequentially into fluid, mechanical, then electrical energy. In addition, various static approaches to directly convert heat into electricity are in development for small-scale applications, including thermoelectric, thermionic, and thermophotovoltaic components coupled with a heat source. The engineering challenges to develop such multifaceted and integrated Microsystems are significant. However, most achievements to date have been for subsystems and typically at low performance levels. Thus, there remains a need to develop small and viable portable power generation systems that are capable of achieving acceptable performance power outputs and efficiencies.

Accordingly, it is desirable to provide systems and methods that overcome these and other deficiencies of the prior art.

SUMMARY OF THE INVENTION

In accordance with the present invention, an integrated micro steam turbine power plant on-a-chip has been provided. The integrated micro steam turbine power plant on-a-chip of the present disclosure (sometimes referred to herein as a "Rankine device" or a "power plant-on-a-chip") consists of a miniature electric power generation system fabricated using silicon microfabrication technology and lithographic patterning. The described system converts heat to electricity by implementing a thermodynamic power cycle on a chip. The steam turbine power plant on-a-chip is comprised of a turbine, a pump, an electric generator, an evaporator and a condenser.

The turbine is formed by a rotatable, disk-shaped rotor having a plurality of rotor blades disposed thereon and a plurality of stator blades. The plurality of stator blades are interdigitated with the plurality of rotor blades to form the turbine. The pump for pumping a working fluid (e.g., water) through the steam turbine power plant-on-a-chip is integrated into the disk-shaped rotor. The pump is driven by the turbine. In some embodiments, the pump is a spiral groove viscous pump. In some embodiments, the spiral groove viscous pump may be located radially inward or outward from an exit end of the condenser.

The pump delivers pressurized working fluid through the evaporator. In some embodiments, the evaporator is a plurality of microchannels which may be coupled with a heat source or may absorb heat from the ambient environment. Alternatively, the evaporator may be porous media. In accordance with some aspects of the invention, the microchannels or porous media are arranged radially outwards from the rotor disk. In accordance with other aspects of the invention, the microchannels or porous media may be arranged normal to the power plant-on-a-chip or in a serpentine layout.

Upon exiting the evaporators channels, the vaporized fluid is directed to the entrance of the turbine where it may flow radially outwards along the top side of the rotor disk, through concentric turbine stages. Vapor flow exiting the turbine then proceeds to the condenser. Similarly to the evaporator, a condenser system for cooling the working fluid may include a plurality of microchannels which may be coupled with a heat sink. Alternatively, the condenser may be porous media. In accordance with some aspects of the invention, the microchannels or porous media may be arranged radially outwards from the rotor disk, normal to the chip, or in a serpentine layout. Upon exiting the condenser, the working fluid is transported back to the pump to start the power generating process over again.

The electric generator is also driven by the turbine and converts mechanical energy into electrical energy. The rotor risk has a turbine on one side and a generator on the opposite side.

In some embodiments, an axial bearing for maintaining an axial position of the disk-shaped rotor is provided. The axial bearing includes at least one flow restriction that is located near a portion of the disk-shaped rotor, where a portion of the working fluid in a high-pressure steam state is directed between the at least one flow restriction and the disk-shaped rotor.

In some embodiments, a journal bearing for maintaining a lateral position of the disk-shaped rotor is provided. The journal bearing includes a second at least one flow restriction that is located near another portion of the disk-shaped rotor, where a portion of the working fluid is directed between the second at least one flow restriction and the disk-shaped rotor.

These may be implemented as a closed Rankine power cycle within a 1 cm$^3$ size device (chip). Heat is provided to one region of the chip, i.e., system. The heat energy utilized by the steam turbine power plant may be generated by an existing heat source or a dedicated heat source (e.g., integrating the steam turbine power plant with a combustor and a fuel source). Alternatively, the steam turbine power plant may utilize excess heat that is present in the surrounding environment. A portion of the heat that is absorbed by one region of the steam turbine power plant is converted to electricity, while a remaining portion is discharged from another region of the chip. Energy conversion is accomplished by a turbine-based, two-phase Rankine power cycle. The components may be fabricated in materials, such as silicon, silica, or refractory ceramic wafers using lithographic, etching, and wafer bonding techniques, to form a planar chip enclosing the components.

In some embodiments of the present invention, the systems described herein are capable of producing between 1-100 watts of power with energy conversion efficiency in the range of 1-11%. Therefore, when used with an integrated heat source, the micro steam turbine power plant on-a-chip is suitable for use to, for example, replace batteries in a handheld device, cellular telephone, or any other suitable electronic device. In another example, the systems and methods disclosed herein may be used to provide electric power to portable or distributed applications, such as consumer electronics (e.g., laptop computers, DVD players, PDAs), handheld biomedical devices, micro air vehicles (drones), power tools, mobile robots, and distributed sensors for environmental monitoring.

In some embodiments the systems and methods described herein may be used to provide electrical power for on-board (e.g., airborne, ground-based, underwater, etc.) vehicle electronics, sensors, actuators, communication and/or electric propulsion subsystems, thereby reducing the need for low power density batteries and auxiliary power units. In yet another example, space vehicles may use the micro steam power plant-on-a-chip using radiative heating and cooling.

Compared with internal combustion and gas turbine engines, the Rankine device described generally herein: 1) operates on a closed cycle, with the working fluid chosen to be water (or any other suitable liquid); 2) pumps a liquid instead of compressing a gas, which dramatically reduces the compression work and allows higher pressures; 3) adds heat to the working fluid via a heat exchanger as opposed to direct combustion, thereby allowing a wide range of heat sources; and 4) rejects heat to the surroundings through a heat exchanger, as opposed to simply rejecting hot gases to the ambient.

Thus, compared to the micro gas-turbine engines that have been developed by MIT (see, e.g., U.S. Pat. Nos. 5,932,940 and 6,392,313 to Epstein et al., which are hereby incorporated by reference herein in their entireties), the Rankine cycle systems and methods described herein allow the use of a liquid pump instead of a gas compressor to rise the pressure of the working fluid, which requires a smaller portion of the turbine power available, and is therefore less susceptible to low component efficiencies and heat transfer in the fluid machinery. Moreover, compared to other portable power sources (e.g., batteries), the described systems and methods allow for instantaneous recharging by replenishing the fuel tank, offers approximately ten times the power and energy density of batteries, may be manufactured at low cost and in high volumes using semiconductor manufacturing techniques.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

DETAILED DESCRIPTION OF THE PREFERRED EMBODIMENTS

Figure 1:
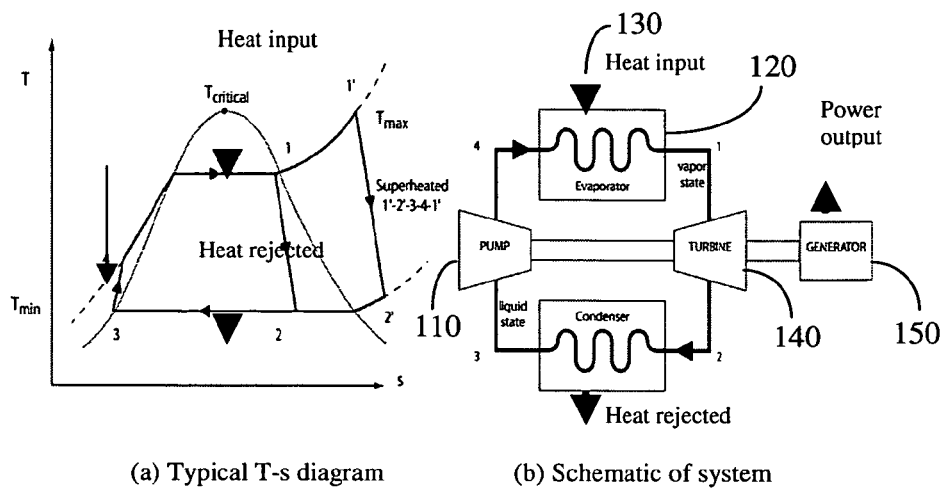
FIGS. 1A and 1B show a superheated Rankine power cycle in accordance with some embodiments of the present invention.

In accordance with the present invention, a microfabricated steam turbine power plant-on-a-chip that delivers electricity by scavenging waste heat or through combustion of a fuel and methods of making the same are provided. To fabricate the stream turbine power plant-on-a-chip, semiconductor fabrication techniques, such as photolithography, deep reactive ion etching, and aligned bonding of silicon and glass wafers, are used. This stream turbine power plant-on-a-chip implements a closed Rankine power cycle using a high-speed microturbine with an integrated pump and generator, as well as on-chip heat exchangers. As shown in FIGS. 1A and 1B, a working fluid in liquid phase is compressed with a pump 110 (states 3 to 4) and then evaporated using an evaporator 120 (state 1) and superheated to a maximum cycle temperature (state 1', $T_{max}$) through one of the on-chip heat exchangers 130. The working fluid in vapor form then expands through a turbine 140 (state 1' to 2') to provide mechanical shaft power to drive the pump 110 and an integrated micro-generator 150. The cycle is closed by condensing the working fluid (state 2' to 3) by rejecting heat to the surroundings. Each power plant chip generates in the range of about 1-10 Watts of electrical power. In one embodiment, the power plant chip has dimensions of about 3 mm thick by 1 cm² (planar form). It should be noted that other components, such as a heat supply, a heat sink, and power electronics, may also be used in order to form a complete power generation system.

In some embodiments, a single micro Rankine device coupled with a fuel burner may be used as a compact power generator for portable electronics, distributed sensors, and other small scale applications and devices. These micro heat engines may also be used to generate power from solar radiation or scavenge energy from waste heat, acting for example as a bottoming cycle for other heat engines by covering the engine and exhaust with an array of such chips; the output power then scales proportionally with covered area.

Figure 2:
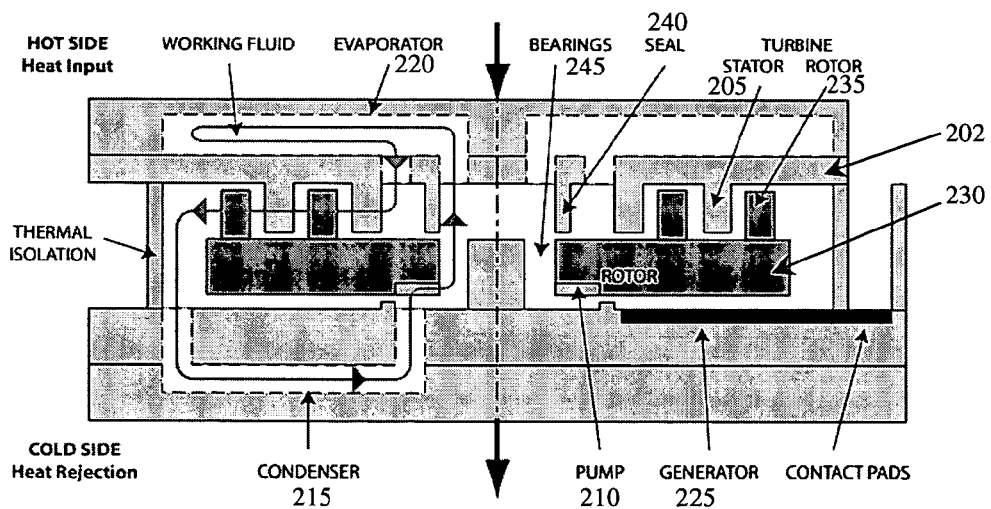
FIG. 2 is a simplified illustration of one example of a cross-section schematic of a micro steam-turbine power plant-on-a-chip in accordance with some embodiments of the present invention.

FIG. 2 is a cross-sectional view of one example of a steam turbine power plant on-a-chip design in accordance with some embodiments of the present invention. As shown in FIG. 2, the steam turbine power plant 200 has several stator blades 205, a hub (or post), a pump 210, a condenser system 215, an evaporator system 220, a generator system 225, and a disk-shaped rotor 230 that has several rotor blades 235. It also includes several seals (e.g., seal 240) and bearings (e.g., bearing 245). The steam turbine power plant system 200 consists of a multi-wafer stack that encloses all these components, e.g., the disk-shaped rotor, microchannels, electromechanical components, etc. In FIG. 2, the disked-shaped portion of the rotor 230 has an outer radius and an inner radius $R_1$, i.e., the rotor has a hole (having a radius $R_1$) located in its center. The rotor is centrally disposed around the hub so that a passageway exists between the inner radius of the rotor and outer surface of the hub. Alternatively, the steam turbine power plant on-a-chip may not include a hub and the working fluid passes up through the central hole of the disk. In another suitable embodiment, the rotor disk does not include a central hole but instead includes a plurality of passageways (holes) that are disposed at some radial distance from the center of the rotor disk.

The rotor disk 230 has a planar multistage turbine 202 on one side and a micro-generator 225 on the opposite side. The pump 210 is etched into the underside of the rotor disk 230 at the inner radius $R_1$ inboard of the generator and delivers pressurized liquid working fluid through the passageway that exists between the inner radius of the rotor 230 and the hub (if present).

The pressurized working fluid then flows through a plurality of microchannel evaporators 220 (a heat exchanger) that are disposed on the hot side of the chip where the working fluid is vaporized and is superheated. In some embodiments, the microchannel evaporators are arranged radially outward from the center of the device, e.g., radially outward from the center of the hub as viewed from the top. In other suitable embodiments, the working fluid may be distributed over the entire chip area, which then evaporates as it flows through a porous layer or array of microchannels that are formed in a direction perpendicular or normal to the chip 200 towards the hot side of the chip (i.e. away from the turbine).

Upon exiting the channels of the evaporator 220, the vaporized fluid is then directed to the (inboard) entrance of the multistage turbine 202 where it flows radially outwards along the top side of the rotor disk 230, through concentric turbine stages, each consisting of stationary concentric rows of stator blades 205 (attached to a top plate) interdigitated with concentric rows of rotating rotor blades 235 that extends upward from the disk 230. Vapor flow exiting the turbine then proceeds around the outer edge of the rotor disk 230 and enters the entrance of the condenser heat exchanger 215 that is located on the cold side of the chip. As the working fluid travels through the condenser heat exchanger 215, the working fluid condenses back to a liquid state. Like the evaporator system 220, the condenser system 215 may include a plurality of microchannels that are arranged in a direction perpendicular to and radially outward from the center of the device 200. Alternatively, the vapor may be distributed over the entire chip area, which then condenses on a porous layer or an arrays of microchannels formed in a direction normal to the chip. Upon exiting the condenser system 215, the working fluid is then directed (sucked) into the pump 210 where the cycle is then repeated. In certain exemplary embodiments, the exit ends of the condenser microchannels are located outboard of the pump 210 and, thus, upon exiting the condenser system 215, the working fluid travels radially inward before being drawn into the pump 210. Seals 240 are required on both sides of the rotor disk 230 (either directly disposed onto the rotor disk 230 or, alternatively, disposed onto the surfaces which face the rotor disk 230) to maintain the liquid-phase working fluid within the pump and central area and out of the turbine 202 and the generator 225.

Heat is supplied to the two-phase cycle from one outer surface of the chip (the "hot side" or evaporator side 220) and removed from the opposite surface (the "cold side" or condenser side 215), i.e., a heat sink. The systems and methods described herein may be used to generate supplemental electric power from waste heat that is generated by another source or system, such as a propulsion system or electronics, for example. In these situations, the evaporator 220 is preferably closely integrated with (or in proximity to) the source of waste heat. Alternatively, a dedicated heat source (e.g., combustion burner), closely coupled to the evaporator 220, may supply the required heat energy. In the systems and methods described herein, heat may be removed from cold side (condenser 215) of the chip. The described systems and methods similarly can utilize cooling effects that are already present within the environment that the chip is disposed or, alternatively, a dedicated cooling source may be utilized.

For example, in one embodiment, the cold side of the steam turbine chip is coupled to the inside surface of the skin of an aircraft. Being exposed to very cold temperatures ($T_{amb}$ can be as low as $-50°$ C.), the skin of the aircraft can act as a heat sink to cool the condenser side of the chip. In an alternate embodiment, a cooling fan powered by a fraction of the steam turbine power plant-on-a-chip power output may be used to provide the necessary cooling effects. Convection cooling may be enhanced by adding a fin array or other suitable heat sink to increase the exposed area. In certain other exemplary embodiments, an external source of liquid (not the Rankine cycle working fluid) is evaporated on the outer surface of the chip, on the cold side, to remove the heat.

In some embodiments, fluid film bearings (e.g., bearings 245) support the rotor 230 in the radial and axial directions. A journal bearing is preferably located at the outer diameter of the disk, which is lubricated by the pressurized working fluid in vapor state. In some embodiments, the journal bearing is formed between a central post (hub) and the inner radius of the rotor and the working fluid in liquid state is used to lubricate the bearing. In either embodiments, the journal bearing may operate hydrostatically, using fluid internally pressurized by the pump to create forces to support the rotor 230, or hydrodynamically, using the rotor motion to locally induce a pressure forces in the bearing. Axial thrust balance of the rotor 230 is provided by the pressures in a combination of components on both sides of the rotor 230, including in the viscous pump 210, seals 240, turbine 202, and generator 225. In certain embodiments, a hydrostatic thrust bearing is created in the generator gap. Holes or slots near the inlet of the turbine 202 (inner radius of the disk) allow high pressure steam to leak through the rotor 230 and pressurize the back side of the disk 230 (over the generator area). The bearing fluid then flows along the generator gap and through a restriction near the outer radius of the disk 230 before joining the rest of the working fluid in the condenser 215. The overall dimensions of the device are on the order of about 3 mm thick×1 to 2 $cm^2$.

This system of FIG. 2 was implemented with the following design principles in mind:
  Locate the components operating at high temperature near the "heat input" side of the device, and the components operating at lower temperature near the "heat output" side of the device;
  Minimize stray heat conduction between the hot and cold sides of the device, for which no work is extracted;
  Minimize the total number of wafers and thickness of each one to reduce complexity and cost;
  Constrain the rotor to be manufactured from only one wafer to limit complexity and potential rotor imbalance; and
  Allow direct integration of the generator on the same spool as the turbine and pump to minimize alignment and bearing dynamic load requirements.

The preferred embodiments allow modern manufacturing techniques (e.g., those used in semiconductor manufacture) to be readily employed to fabricate a steam turbine power plant-on-a-chip. The fabrication approach for the steam turbine power plant-on-a-chip design is based generally on silicon microfabrication technology. First, the electrical components are fabricated on silicon wafers using thin and thick film processing and lithography. It should be noted that the substrate, in accordance with one embodiment, is a monocrystalline silicon wafer. In some embodiment, the wafer may be a semiconductor wafer composed of a material from a Group IV element. Examples of Group IV semiconductor materials include silicon, germanium, carbon, and the like. Alternatively, the wafer may be of a material from any of the Group IIIA and VA elements (III-V semiconductor compounds), mixed III-V compounds, Group II(A or B) and VIA elements (II-VI semiconductor compounds), and mixed II-VI compounds. Examples include gallium arsenide (GaAs), gallium indium arsenide (GaInAs), gallium aluminum arsenide (GaAlAs), indium phosphide (InP), cadmium sulfide (CdS), cadmium mercury telluride (CdHgTe), zinc selenide (ZnSe), sinc sulfur selenide (ZnSSe), and the like.

Shallow features, such as tip clearance, seal gaps, and grooves for the viscous pumps (e.g., pump 210), are then lithographically defined and etched. Deep structures, such as turbine blades (e.g., stator blade 205) and flow channels, are then formed into the bulk of the silicon wafers by deep reactive ion etching (DRIE) of lithographically-defined features on both sides of the wafers. Through hole are created when deep etched features from both sides of a wafer intersect. The final device is formed by bonding the silicon wafers, creating a laminated, monolithic static structure with integrated quasi-three dimensional flow paths. The single-crystal silicon rotor is enclosed in the static structure and naturally integrated with the other components.

Approaches have been initially developed at MIT for the fabrication of high performance micro-machinery, such as micro gas turbine engines and generators. Single crystal silicon has been demonstrated as a viable material for high-performance micro-machinery, even though geometric design flexibility is limited by the 2D nature of etching. DRIE and wafer bonded silicon structures have sustained high-speed rotation, high temperature gases in micro-combustors, and high pressures in micro rocket engines. Furthermore, the integration of a thin film micromotor within a bonded wafer stack has been demonstrated. While these fabrication approaches are appropriate for some of the requirements, such as high speed rotation, high pressure operation, and integration of electromechanical components, it lacks thermal isolation capabilities. Conduction through the structure separating the evaporator from the condenser must be minimized to maintain acceptable efficiency. A central layer formed of low conductivity material, such as glass, is required. The impact of thermal isolation on device performance will be discussed below, after the cycle analysis and presentation of component designs.

Figure 3:
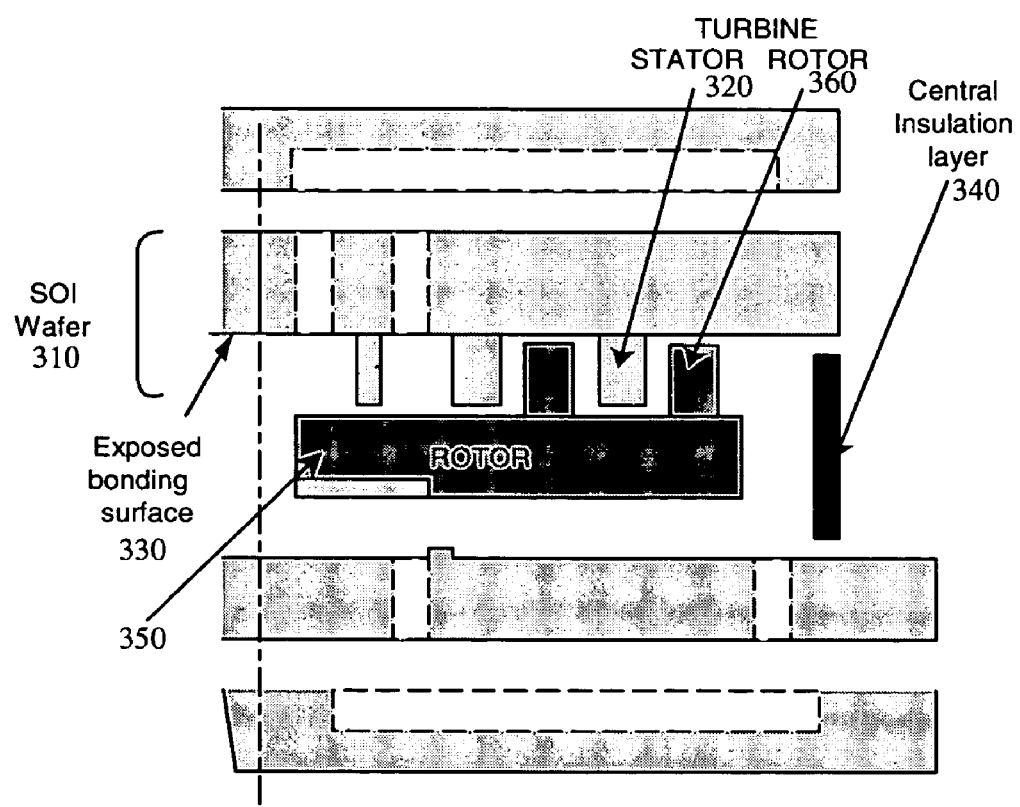
FIG. 3 is a simplified illustration of one example of the interdigitated turbine blades in accordance with some embodiments of the present invention.

FIG. 3 is a simplified illustration of one example of forming interdigitated rotor and stator blades for the steam turbine power plant-on-a-chip in accordance with some embodiments of the present invention. In order to create interdigitated rotor and stator blade rows, two wafers cannot simply be bonded on their original smooth surface because etched surfaces typically exhibit surface roughness beyond what is acceptable for adequate bonding. The proposed approach therefore consists of using a Silicon-on-insulator (SOI) wafer 310 as the substrate supporting the stator blades 320, as illustrated in FIG. 3. After etching the blades down to the oxide layer, the underlying smooth bonding surface 330 is exposed by wet etching the oxide. This surface is then bonded to the central insulation layer 340 to enclose the rotor 350. The thickness of the silicon layer that was etched to create the stator blades 320 may be chosen to match the desired rotor blade 360 height and clearance.

Cycle Analysis

The operating cycle is mainly defined by the working fluid, the condenser pressure (or saturation temperature), evaporator pressure (or saturation temperature), and the superheated temperature (see, e.g., FIG. 1). These cycle temperatures are preferably chosen to match the heat source and heat sink temperatures, with enough temperature difference to allow the required heat transfer rate. Two applications with different ambient (heat sink) temperatures are initially considered:

1) Ground power generation or in-cabin use, cooling the device with room temperature air (T=25° C.) with forced cooling required (needs a cooling fan);
2) Air vehicle power generation at flight altitude, cooling the device with ambient air (T=−50° C.) with forced cooling available.

The design point for each application will ultimately be limited by the maximum performance of the components, such as the pump pressure head and the evaporator outlet superheated temperature. The following sections present cycle studies to identify the significant parameters and quantify the potential specific power and efficiency achievable.

Fundamentally, microscale implementation does not affect thermodynamics. Practically however, component efficiencies are typically lower than their large scale brethren and high heat fluxes are required in the heat exchangers. The following sections assess the impact of these practicalities on cycle efficiency and power output, after defining the performance of a baseline cycle. These studies were used to define the relative importance of the various design aspects, and therefore focus the efforts on the highest impact issues. As will be shown next, the pump efficiency is not critical; the turbine efficiency directly scales the output electrical power, hence is critical; high overall heat transfer coefficient is required on the condenser side in order to allow higher cycle efficiency and power.

As a baseline, the following conditions are first assumed:
Working fluid: water
Fixed condenser temperature: $T_{min}=T_{amb}+50°$ C.$=75°$ C.
Losses:
Turbine adiabatic efficiency: $\eta_t=0.70$
Pump adiabatic efficiency: $\eta_p=0.10$
Negligible pressure drop in heat exchangers
Negligible stray heat transfer (adiabatic turbomachinery and insulated structure)

Figure 4:
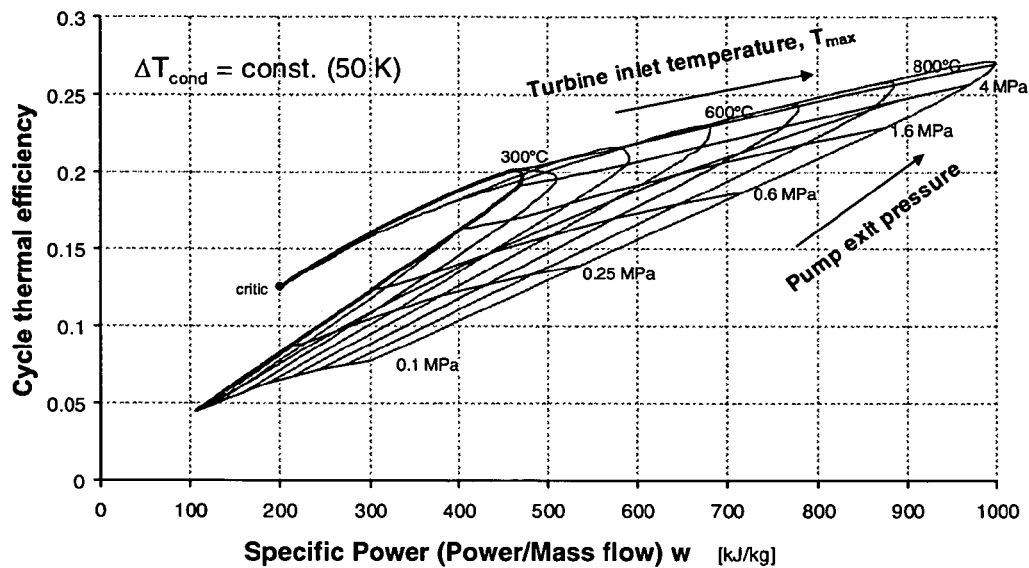
FIG. 4 shows the baseline cycle efficiency and specific power as a function of condenser pressure and superheated temperature in accordance with some embodiments of the present invention.

FIG. 4 presents the performance map as a function of the maximum pressure and temperature in the cycle (pump exit pressure and superheated temperature) in accordance with some embodiments of the present invention. For a given operating condition, the cycle efficiency and power per unit flow rate are read off the axes of the chart. These results will serve as a baseline to assess the impact of component inefficiencies and limitations.

Figure 5:
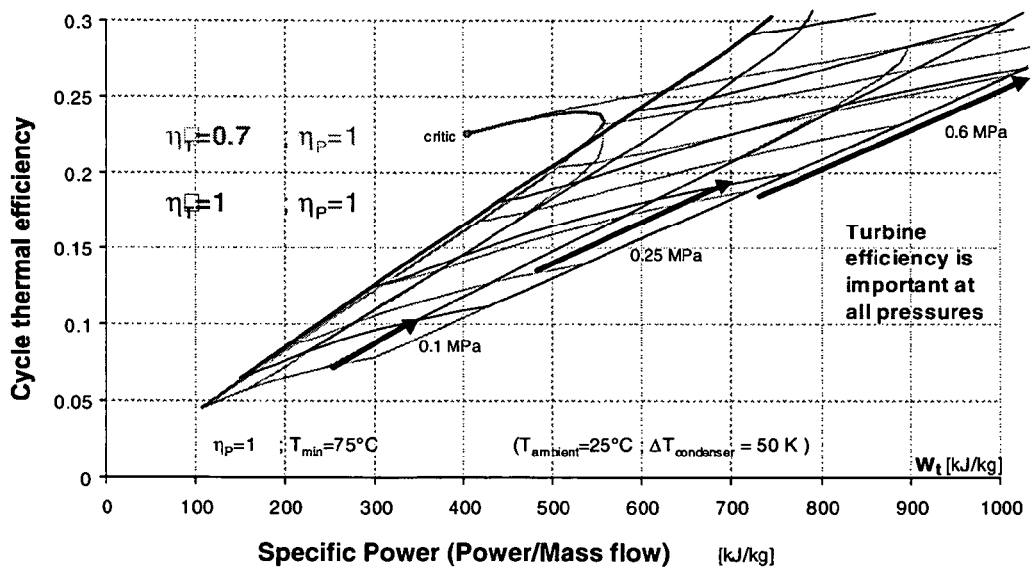
FIG. 5 shows the effect of turbine efficiency on cycle performance in accordance with some embodiments of the present invention.

Current experience with micro-turbomachinery suggests that turbine efficiencies on the order of 70% should be achievable. The impact of uncertainty on this value is illustrated in FIG. 5, showing that the cycle efficiency and output power generally scale directly with the turbine efficiency. This therefore dictates the need for careful aerodynamic design of the turbine.

Figure 6:
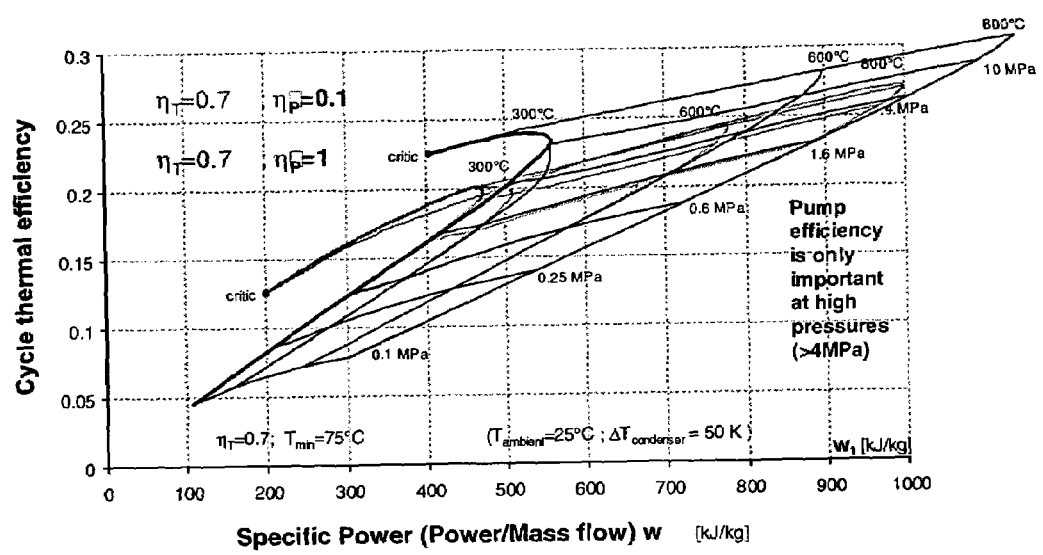
FIG. 6 shows the effect of pump efficiency on cycle performance in accordance with some embodiments of the present invention.

The impact of pump efficiency is also shown in FIG. 6, illustrating that the effect is negligible at pressures below 4 MPa. At higher pressures, the pump consumes an increasing fraction of the turbine output power, such that a lower pump efficiency has a more noticeable (yet minimal) impact. This suggests that lower operating pressures will accommodate relatively inefficient pump designs. The viscous pump presented later has a predicted efficiency of 4-5%, which is acceptable below 4 MPa.

Figure 7:
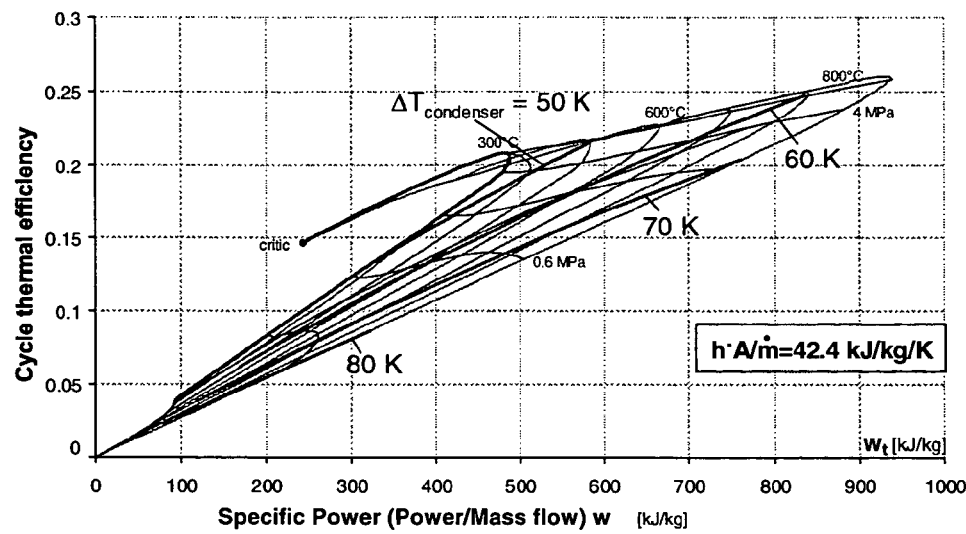
FIG. 7 shows a performance map for constant condenser heat transfer technology, where the temperature difference varies depending on the required heat transfer rate (higher at higher power levels), in accordance with some embodiments of the present invention.

Another significant impact of miniaturization is the need for high heat flux in and out of the heat exchangers. For the systems and methods investigated, the heat flux is expected to be greater than 50 W/cm². The main challenge will be on the condenser side, since the temperature difference is not expected to be as high as on the evaporator side. This limitation is reflected in the following performance maps which maintain a constant overall heat transfer coefficient, h, and area, A, between the condensing fluid and the ambient, per unit flow rate (h A/mass flow). The condenser pressure, hence saturation temperature, are therefore varied across the map in order to reject the required amount of heat from the cycle (per unit mass flow). FIG. 7 shows a revised performance map, with contours of constant condenser temperature, $T_{min}$, for reference in accordance with some embodiments of the present invention. As shown, high power levels require larger temperature difference, hence a higher condenser temperature since the ambient temperature is fixed.

Figure 8:
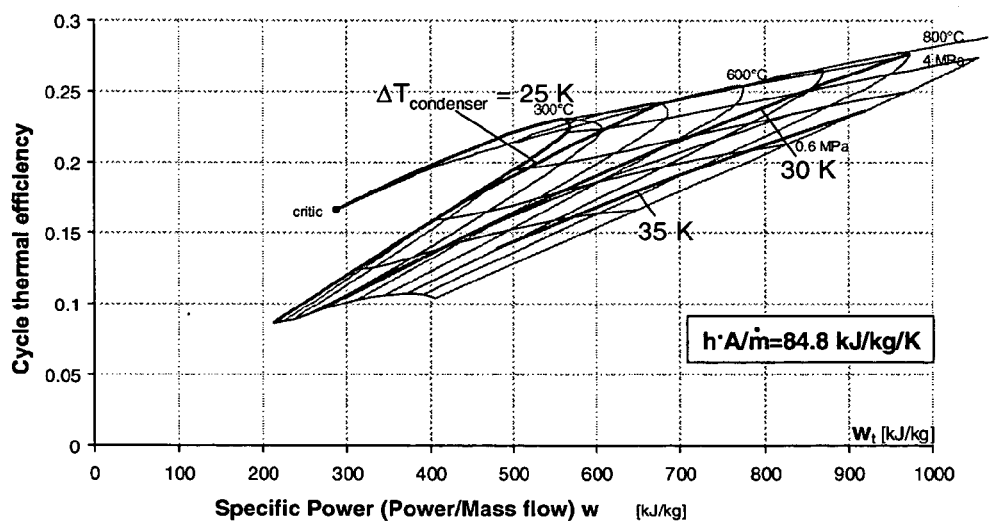
FIG. 8 shows a performance map for double the heat transfer coefficient than that in FIG. 7 in accordance with some embodiments of the present invention.

Due to increased heat transfer coefficients in small diameter channels, microchannel heat exchangers have the potential to provide very high heat fluxes. The impact of the overall heat transfer coefficient on the condenser side is illustrated in FIG. 8, which shows a significant increase on power and efficiency, mostly due to the lower required condenser temperature to achieve the same heat transfer rate.

Figure 9:
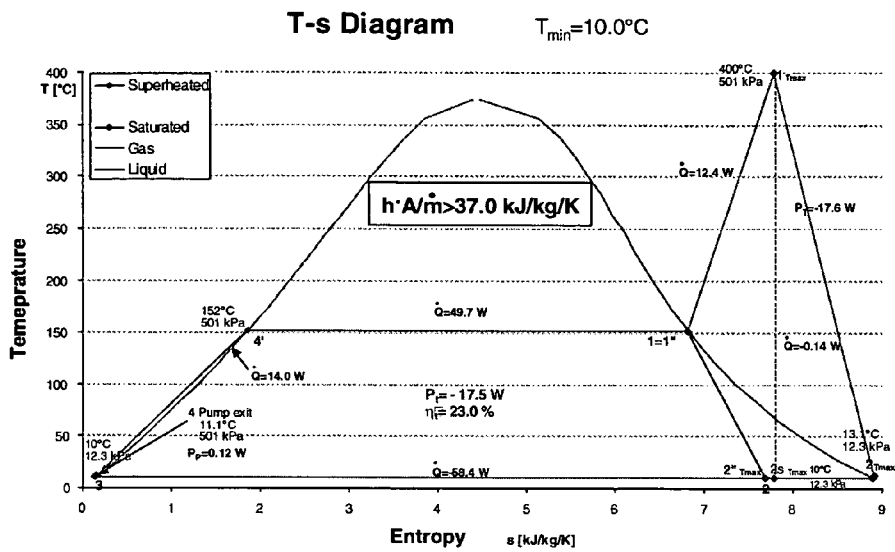
FIGS. 9A and 9B show temperature-entropy diagrams for the conditions of two applications in accordance with some embodiments of the present invention.
Figure 9:
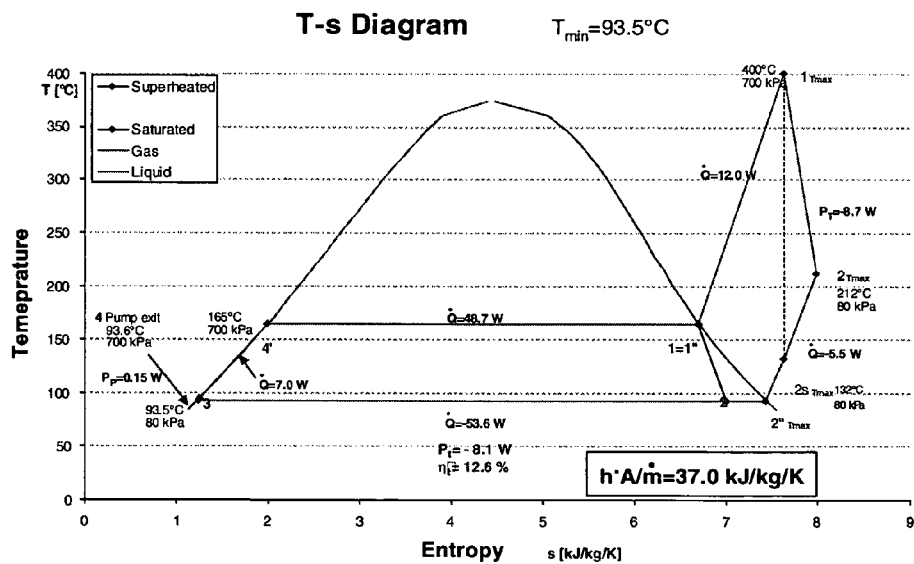

The design point will be ultimately limited by the maximum performance of the components, such as the pump pressure head and the evaporator outlet superheated temperature. As a compromise between good cycle performance and reasonable demand on the components, the following nominal design point was chosen: 0.6 MPa, 400 C, 24 mg/s. This was used for the initial component design. FIG. 9 shows the T-s diagram for these conditions and two different condenser temperatures (e.g., a $T_{min}$ of 10° C. and a $T_{min}$ of 93.5° C.) in accordance with some embodiments of the present invention.

Cycle analysis was also performed to assess the appropriateness of various working fluids other than water, which has been used as the baseline fluid to date. Steam is preferably used as the working fluid for power cycles. It offers a large change of enthalpy over practical pressure differences, in addition to being well characterized, abundant, and environmentally benign.

In accordance with the present invention, the fluid temperatures in the cycle are constrained to be within the heat source and sink temperatures. This temperature difference is therefore substantially fixed by the present invention. Water is the preferable fluid for use with the present invention as it appears to be the most beneficial working fluid for power generation with ambient cooling. It should be noted, however, that any other suitable working fluids may also be used that provide an acceptable match with the saturation temperatures of the heat source and heat sink. The working fluid preferably allows evaporation without leaving residues on the wetted surfaces, and does not impede operation of the generator (e.g., be a dielectric or non-conducting fluid). In the embodiment where water is used as the working fluid, it is preferably pure and de-ionized.

The operating cycle is generally defined by the condenser pressure (or minimum temperature), evaporator pressure (or saturation temperature), and the superheated temperature. Two applications with different ambient temperatures are initially considered:

Saturation temperature, $T_{min}$=10° C. (condenser temperature)

Saturation temperature, $T_{min}$=93.5° C. (condenser temperature)

The common parameters for the two cases are assumed to be:
Turbine efficiency, $\eta_t$=0.70
Pump efficiency, $\eta_p$=0.05

Figure 10:
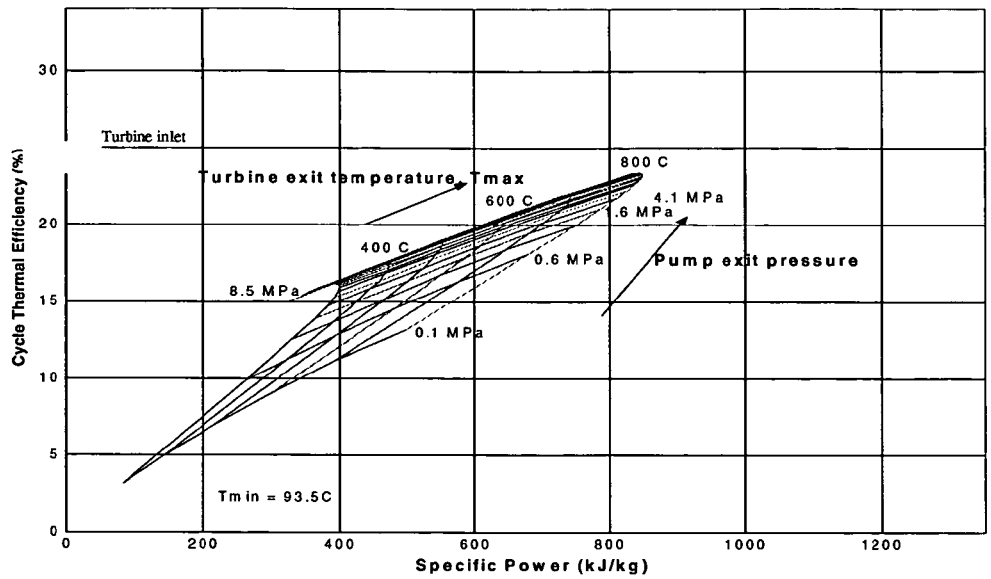
FIGS. 10A and 10B show baseline cycle efficiency and specific power as a function of pump exit pressure and superheated turbine inlet temperature (water, assuming $\eta_p$=5%, $\eta_t$=70%) in accordance with some embodiments of the present invention.
Figure 10:
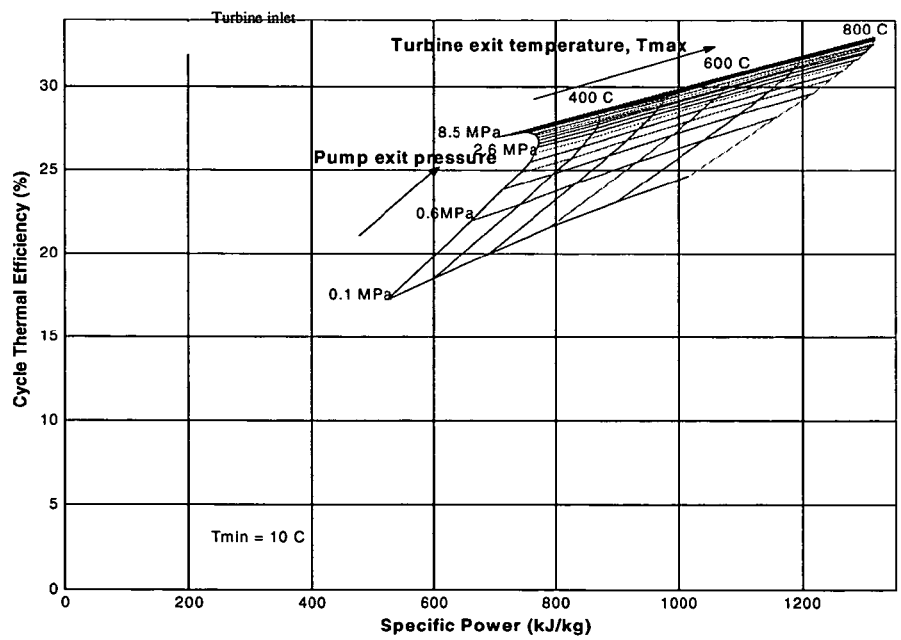

FIG. 10 shows the performance parameterized by maximum pressure and maximum temperature in the cycle (pump exit pressure and superheated temperature) in accordance with some embodiments of the present invention. The cycle efficiency and power per unit flow rate are obtained from FIG. 10 by locating the point that corresponds to a given temperature-pressure pair. For constant temperature, as the pump exit pressure increases beyond 4 MPa, specific power decreases but the efficiency continues to increase. The decrease in specific power can be explained by noting that as the pump pressure increases, the power consumed by the pump also increases, which in turn causes the net specific power to decrease. Since the current baseline design pressure of 0.6 MPa is significantly lower than 4 MPa, there is potential for a large increase in power density and efficiency, once the technology has been developed to a high level of performance. The more conservative design objective is chosen here in order to reduce development time for a practical device to be demonstrated, and provide a building block for future development of microengines. The potential for higher performance however motivates long term research and development of such technology.

Turbine

A key component of the present invention is the turbine, which converts fluid power to mechanical power to drive the pump, the generator, and counter friction losses on the rotor. As suggested by the cycle studies, high pressure differentials on the order of tens of atmospheres are desirable. In order to stay within a conservative aerodynamic and mechanical design space (200-400 m/s tip speed), a multistage turbine is used. Unfortunately, the lithography-based microfabrication approach does not allow the fabrication of truly three-dimensional turbomachinery, limiting the design freedom often required to create the most efficient flow fields. In order to create aerodynamic profiles, the blades are preferably defined in the plane of the wafer using micron-resolution lithography, then etched to create extruded-like blades extending normal to the substrate.

Figure 11:
FIG. 11 is a simplified illustration of one example of a micromachined turbine having constant blade height constraint imposed by the etching approach in accordance with some embodiments of the present invention.

Accordingly, since the turbine blades are formed in a single, common etch step, all blades are constrained to a uniform height, h. FIG. 11 shows one example of a micromachined turbine which has the constant blade height geometry in accordance with some embodiments of the present invention. Due to this limitation of silicon micromachining and the planar geometry, the design space is significantly different than for traditional turbomachinery. The main differences are that:

1) each stage (blade row) operates at a different tip speed, proportional to the radius: $U=\Omega \cdot r$;
2) the throughflow area increases linearly with radius: $A(r) = 2\pi \cdot r \cdot h$ with constant blade height, h, which imposes area variations across each blade row, and from stage to stage;
3) blade shapes are constrained to 2D extruded-like shapes, without any twist along the span.

The main design parameters are generally: blade height/mass flow, rotational speed, blade angles, and radial locations (leading edge radius and blade cords). In order to achieve high levels of power, the flow velocities and the amount of turning across each blade row should be maximized. Generally, this leads to shorter blade spans (height) and smaller radii (for constant tip speed, U) to reduce the throughflow area and increase flow velocities.

In the following sections, design studies that investigated the effect of the main design parameters on the power level achievable with radial, planar micro-turbomachinery are presented. Throughout these studies, the parameters are varied within conservative bounds in order to promote robustness and allow acceptable off-design operation. For example, the flow is constrained to remain subsonic with a maximum Mach number on the order of 0.7 and flow angles are limited to 60 degrees. Since, numerical analysis, such as computational fluid dynamics (CFD), performed for micro gas turbines suggest turbine efficiencies in the range of 65-75%, an efficiency of 70% is assumed in the current analysis.

Simple meanline analysis using velocity triangles and thermodynamic properties of steam (computerized tables) is performed for this radial configuration. The current turbine modeling consists of a meanline velocity triangle analysis, which represents the working fluid, steam, using computerized thermodynamic tables (compressible, real gas properties). Flow angles and throughflow area are assumed to be constant, implying that change of blockage and deviation with operating conditions are neglected. The trends found as a function of blade height and blade angles would however directly apply to the "effective" flow passage height (with blockage) and true flow angle, respectively. Adiabatic conditions are also currently assumed. Isentropic efficiency for each rotor and stator is assumed to be 70%, based on previous experience with turbomachinery of this scale and geometry.

Figure 12:
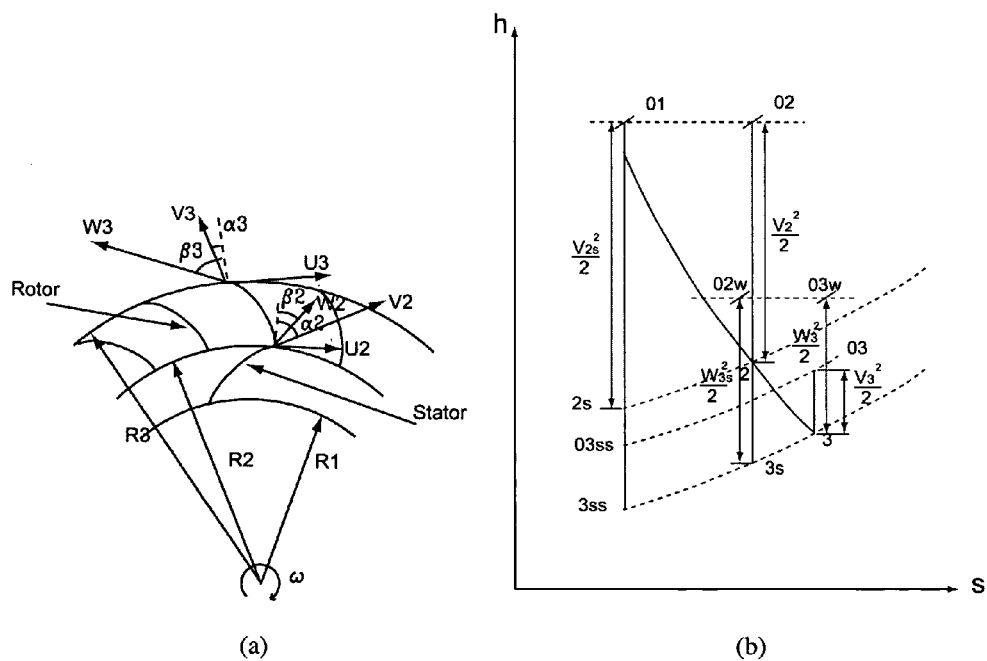
FIGS. 12A and 12B show velocity triangles and thermodynamic (h-s) diagram of one stage turbine analysis in accordance with some embodiments of the present invention.

The main differences with traditional gas turbine analysis are: 1) use of real gas properties, which preclude the use of closed form analytical solutions; 2) that the exit pressure is not constrained, given the closed cycle. An iterative approach is therefore required in defining the exit conditions of a stage, for given inlet conditions, rotational speed and geometry (blade angles, blade height, radial locations). An exit static pressure is first assumed, based on isentropic conditions. The exit density may then be calculated and used to determine the flow velocities at the blade row exit, through mass conservation and velocity triangles. The exit static pressure is then iterated until energy and mass conservation are satisfied, with the work defined by the angular momentum equation and the prescribed isentropic efficiency. In the rotating frame, which corresponds to the rotor, V is replaced by W, which is the relative velocity, α is by β, which is the relative flow angles. Although for axial flow in rotating turbomachinery, total enthalpy is conserved, $$h_{0w} = h + \frac{1}{2}W^2,$$

for radial flow rothalpy is conserved, $$h_{0w} = h + \frac{W^2}{2} + \frac{U^2}{2},$$

where the last term originates from centrifugal force (See FIG. 12). The process to determine the exit condition in the rotor is the same as the stator except for the above replacements.

Figure 13:
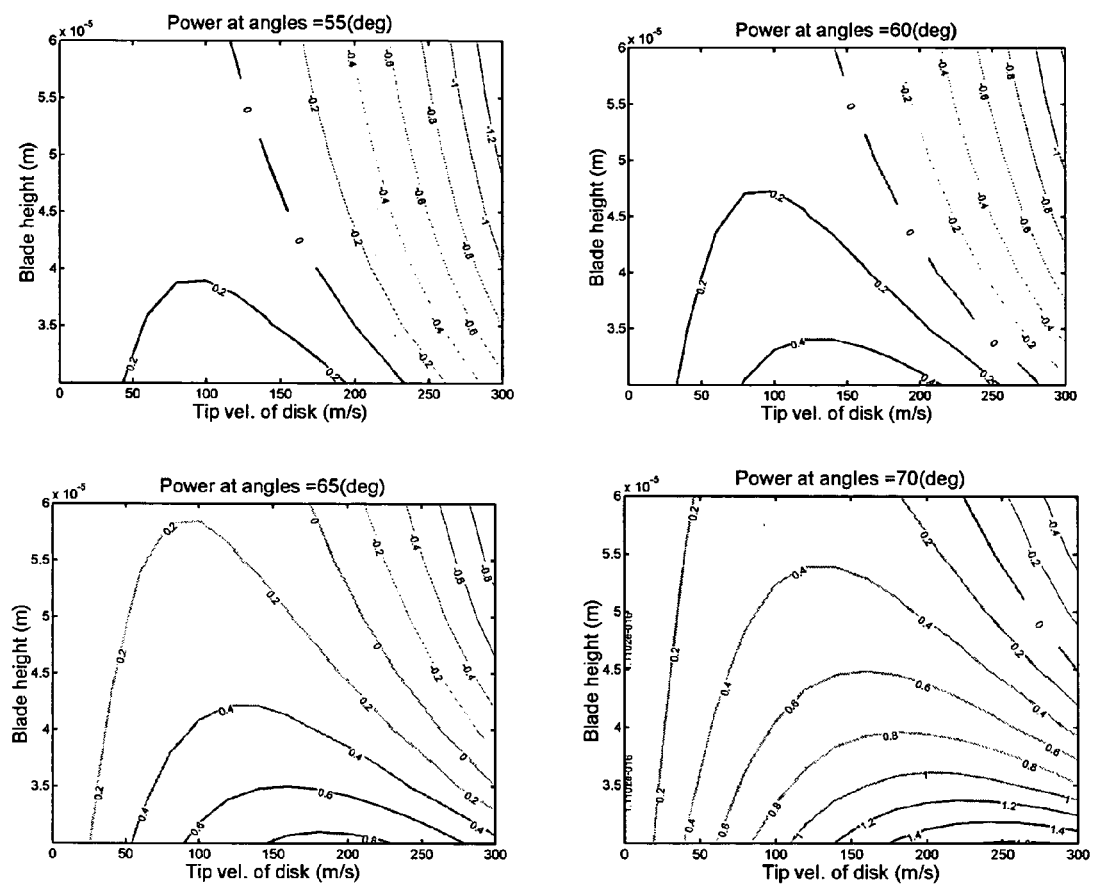
FIG. 13 shows the power contours of different angles, with r1=0.3, r2=0.8, and efficiency=70%, single stage in accordance with some embodiments of the present invention.
Figure 14:
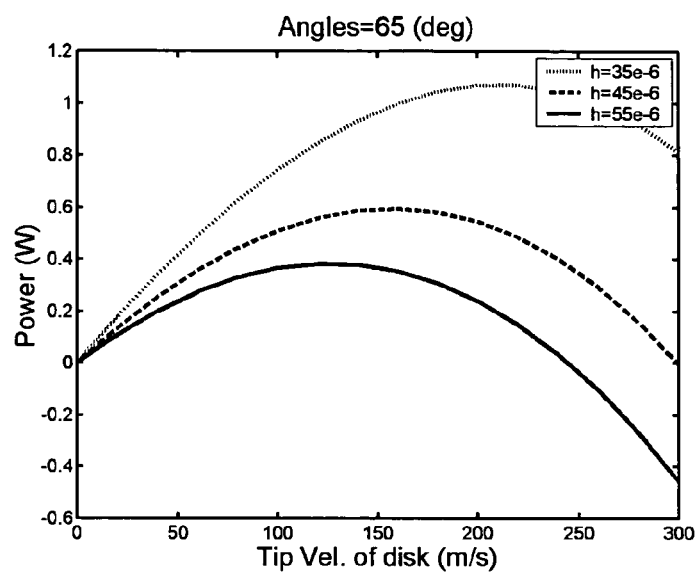
FIG. 14 shows the power for each blade height with r1=0.3, r2=0.8, and efficiency=70% in accordance with some embodiments of the present invention.

In order to guide the design process, a study of a single stage turbine is first carried out across the basic set of design parameters. To reduce the number of variables, the inlet guide vane exit angle was constrained to be the same as the rotor exit blade angle, practically limiting the relative swirl angle at the exit of any blade row. The inlet and outlet radii are set to 0.3 and 0.8 mm respectively, mass flow is set to 0.024 g/s and a turbine adiabatic efficiency of 70% is assumed. The stage output mechanical power for respective blade angles of {55°, 60°, 65°, 70°} are shown in FIG. 13, as a function of blade height and rotational speed. As expected, higher power is achieved for higher blade angles. For a given blade angle and blade height, there is an optimum rotational speed. This optimum is a consequence of the trade-off between increasing power with rotational speed (P=Tω) and a decreasing exit absolute tangential velocity (resulting in a decreasing change of angular momentum, hence torque). The optimum rotational speed changes with blade height since it directly affects the radial velocity, hence the velocity triangles. FIG. 14 shows the turbine power as a function of rotational speed for three different blade heights in accordance with some embodiments of the present invention. It should be noted that zero power represents a free spinning turbine, while negative values of power at high speeds represent shifting of the velocity triangles such that the change of angular momentum has changed sign.

Figure 15:
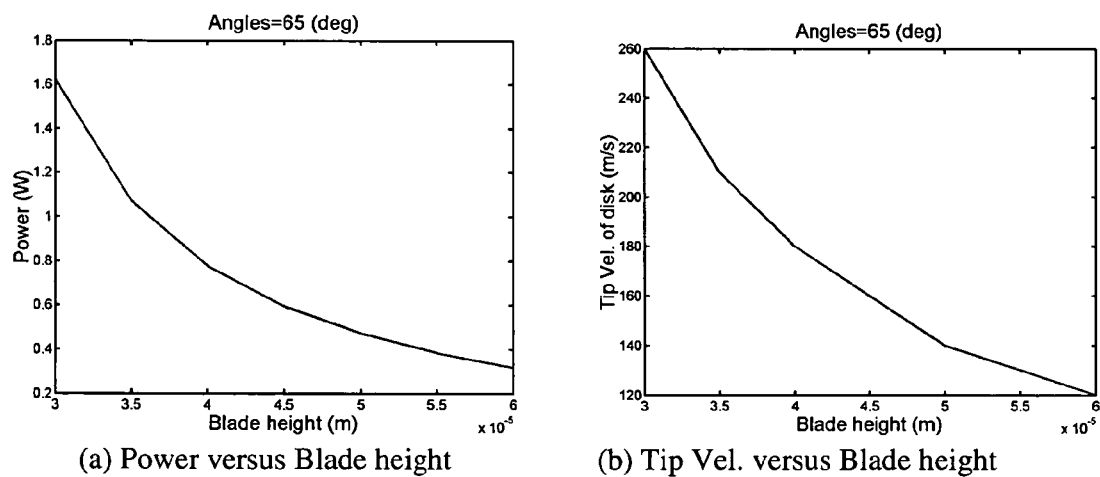
FIGS. 15A and 15B show the maximum power for each blade height, with r1=0.3, r2=0.8, efficiency=70%, and baseline flow conditions in accordance with some embodiments of the present invention.

The maximum (peak) power for each blade height, and the corresponding rotational speed are extracted and shown in FIG. 15. Once augmented with blockage and deviation effects, these charts would serve to define the blade height for a given power requirement. Choice of a blade height should also include the impact of tip clearance losses on the stage efficiency, which has not been analyzed yet for devices of this scale. Generally, higher blades are desirable in order to reduce the tip clearance as a percentage of blade span. For microfabricated turbines previously demonstrated, tip clearance was on the order of 5-10%, suggesting that blade spans of 50 microns or more are desirable for typical 5 microns tip clearance.

For the current analysis, the power level that can be provided by the turbine is on the order of 1 Watt for the baseline flow rate, which is an order of magnitude less than required. A multistage approach is therefore required and will therefore be investigated next.

Figure 16:
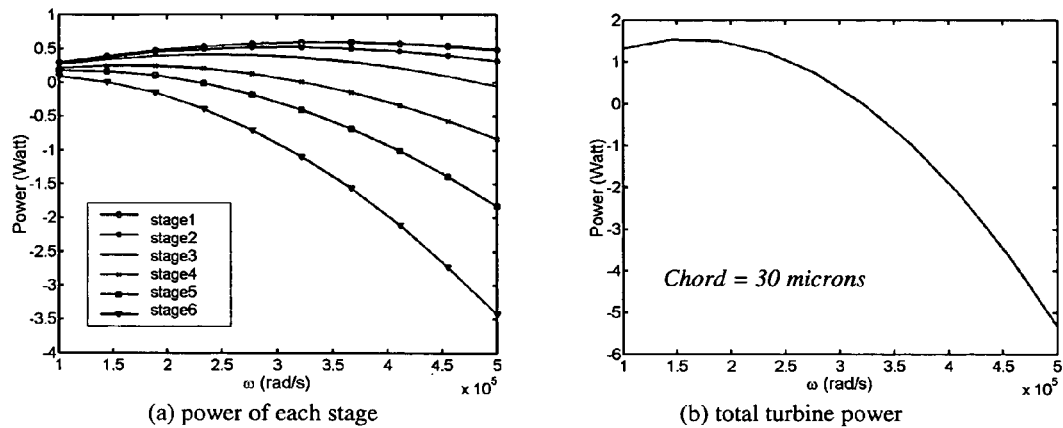
FIGS. 16A and 16B show the power of a 6-stage turbine assuming incompressible flow, shown as a function of rotational speed for each stage and the overall turbine in accordance with some embodiments of the present invention.
Figure 17:
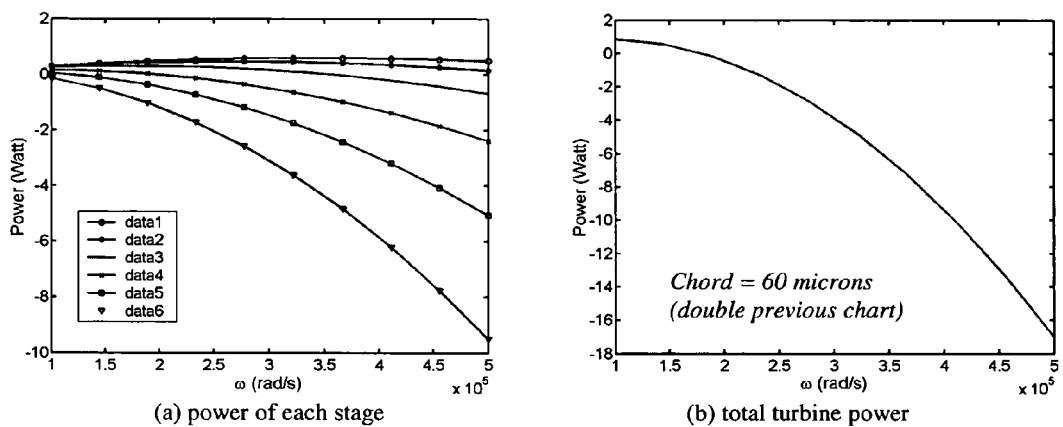
FIGS. 17A and 17B show the power of a 6-stage turbine assuming incompressible flow and having a different blade chord, shown as a function of rotational speed for each stage and the overall turbine in accordance with some embodiments of the present invention.

In order to understand the impact of changing the radial location of the blade rows in a planar geometry, an incompressible velocity triangle analysis was performed for a multistage planar turbine. For example, a six-stage turbine with a constant blade height of 30 microns and a blade chord of 30 microns was considered. The inner radius is located at r=0.45 mm. The exit relative blade angle of each blade row is initially limited to 60 degrees, but reduced to 55 deg and 50 deg for the $5^{th}$ and $6^{th}$ stages respectively in order to maintain the flow Mach numbers below critical values (M<0.7). FIG. 16(a) illustrates the power from each stage as a function of rotational speed, while plot (b) shows the total turbine power (sum of all stages) in accordance with some embodiments of the present invention. At a given speed, it should be noted that the outer stages tend to consume power as opposed to delivering power. The optimal rotational speed (point of maximum power) for each stage is different, illustrating that the stages are mismatched. This results directly from the increasing throughflow area with radius combined with the increasing tip speed with radius. This combination leads to a shift in the velocity triangle, from producing power (inner stages) to consuming power (outer stages). This suggests that the blade chords should be kept to a minimum in order to reduce the change of area and tip speed. To further illustrate this design trend, FIG. 17 illustrates a similar calculation as FIG. 16, but with blade chords of 60 microns instead of 30 microns. The impact is an increase in negative power of the outer stages, since the tip speed is higher and the radial flow velocity further reduced.

Figure 18:
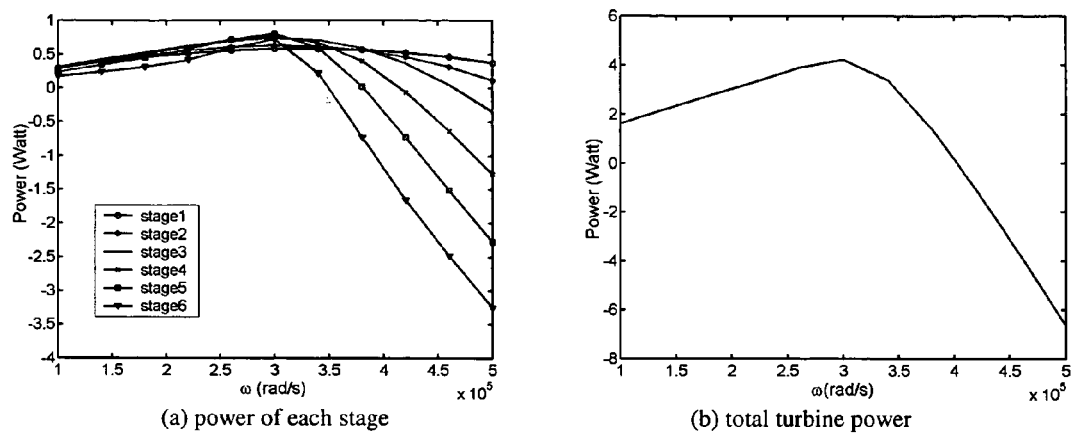
FIGS. 18A and 18B show the power of 6-stage turbine for compressible flow (steam) in accordance with some embodiments of the present invention.

A significant reduction of density occurs as the steam expands through the turbine, especially at high power levels. This tends to increase the flow velocities in the outer stages, counteracting the trend of decreasing velocity with increasing throughflow area. This effect benefits the turbine design by allowing better matching of the stages. FIG. 18 shows the resulting power for each stage (a) and the total turbine power (b) for the same geometry used in FIG. 16 (chord=30 microns), but with compressible flow. Computerized steam tables were used to determine the thermodynamic states at the inlet and exit of each stage in order to determine the converged thermodynamics and velocity triangles. Note that the outer stages deliver positive power over a broader range of speeds and than the optimum speed for all stages in near 30,000 rad/sec, for the configuration considered.

Figure 19:
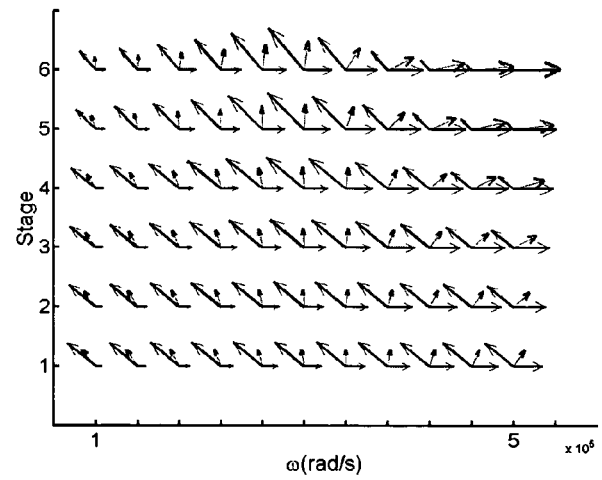
FIG. 19 shows the velocity triangles at the exit of each stage for compressible flow (steam), shown for different rotational speeds in accordance with some embodiments of the present invention.
Figure 20:
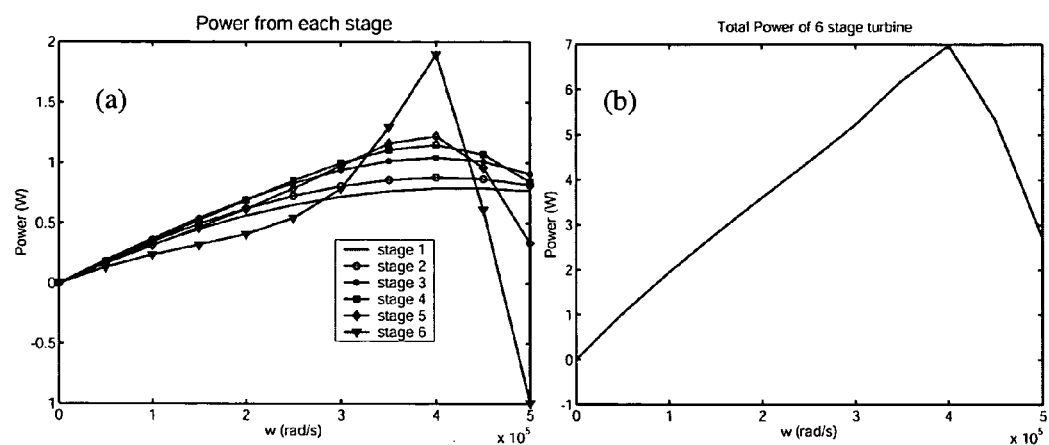
FIGS. 20A and 20B show the turbine output power as a function of rotational speed for the preliminary 6-stage turbine design in accordance with some embodiments of the present invention.

Similarly to the incompressible case discussed above, outer stages tend to consume power at high rotational speeds due to shifting of the velocity triangles. Compressibility, however, tends to increase the radial velocity as the steam expands through the turbine, hence maintaining positive power up to higher rotational speeds. To illustrate this behavior, FIG. 19 illustrates the velocity triangles at the exit of the six stages, over a range of rotational speeds. Note that the radial velocity component (vertical component) remains high from stage-to-stage in the speed range near 30,000 rad/sec, which corresponds to the maximum power range in FIG. 18. At higher speeds however (e.g., ~50,000 rad/sec), the steam does not expand as much, and the increasing area at the outer stages results in lower radial velocity and shifting of the absolute velocity in the tangential direction of rotation— pointing right. In this case, work is done on the fluid, consuming power. Careful design is therefore required to ensure proper stage matching and positive power from all stages. The maximum power level shown here is on the order of 4 watts, which is higher than for the mismatched incompressible case described previously.

Analysis presented to this point suggests that: 1) a multistage turbine would be necessary; 2) stage matching is critical, and can be achieved by choosing the appropriate rotational speed and blade chords; and 3) compressibility is critical in properly matching the stages.

In this section, the preliminary design of a sex-stage turbine is presented, which maximizes the power output while maintaining conservative flow velocities and turning. The objective is to determine the maximum power per unit flow rate achievable for a multistage configuration with matched stages. For this design exercise, flow is constrained to remain subsonic with a maximum Mach number on the order of 0.7; relative flow angles, $\alpha$ in rotors and $\beta$ for stators, is preferred to be less than 60 degrees to ensure robustness; rotor and stator isentropic efficiencies of 70% are assumed. The results indicate that up to 7 Watts appear possible, for the nominal flow rate of 24 mg/s, under these conservative operating conditions. Approaches for higher power are proposed and discussed, such as high operating speeds and use of multiple rotors. Future prospects of microturbine performance is also portrayed for micro-rotors operating at higher flow rates and velocities, showing potential power levels up to 100 Watts per stage, compared to the conservative value of ~1 Watt per stage in the preliminary design.

The main parameters are: blade height, radial locations of blade leading and trailing edges, blade trailing edge angles, and rotational speed, for a given mass flow rate of 24 mg/s for the baseline configuration. Based on previous studies, the blade height is set provisionally to 50 microns. This value is chosen as a trade-off between short blade spans that induce high velocities (due to the reduced flow area) and the long blade spans that reduce hub and shroud losses per unit low rate. The number of stages is limited to six (6), to constrain the challenges in stage matching. Operating parameters are listed in Table 1.

TABLE 1

Main turbine parameters.

| | |
|---|---|
| Inlet stagnation Temperature | 400° C. |
| Inlet stagnation Pressure | 0.6 MPa |
| Mass flow (steam) | 24 mg/s |
| Isentropic Efficiency | 70% |
| $C_p$ | 2080 J/kg · K |
| K | 1.3 |

At first, to produce as much power as possible, a six-stage turbine is designed. FIG. 18 shows the output power as a function of rotational speed, first for each individual stage in (a), and then combined altogether in (b) in accordance with some embodiments of the present invention. Each stage produces around 1 Watt of power up to $5^{th}$ stage and the last stage around 2 Watts. So the total maximum power is 7 Watts at the rotating speed of $4 \times 10^5$ rad/s.

Figure 21:
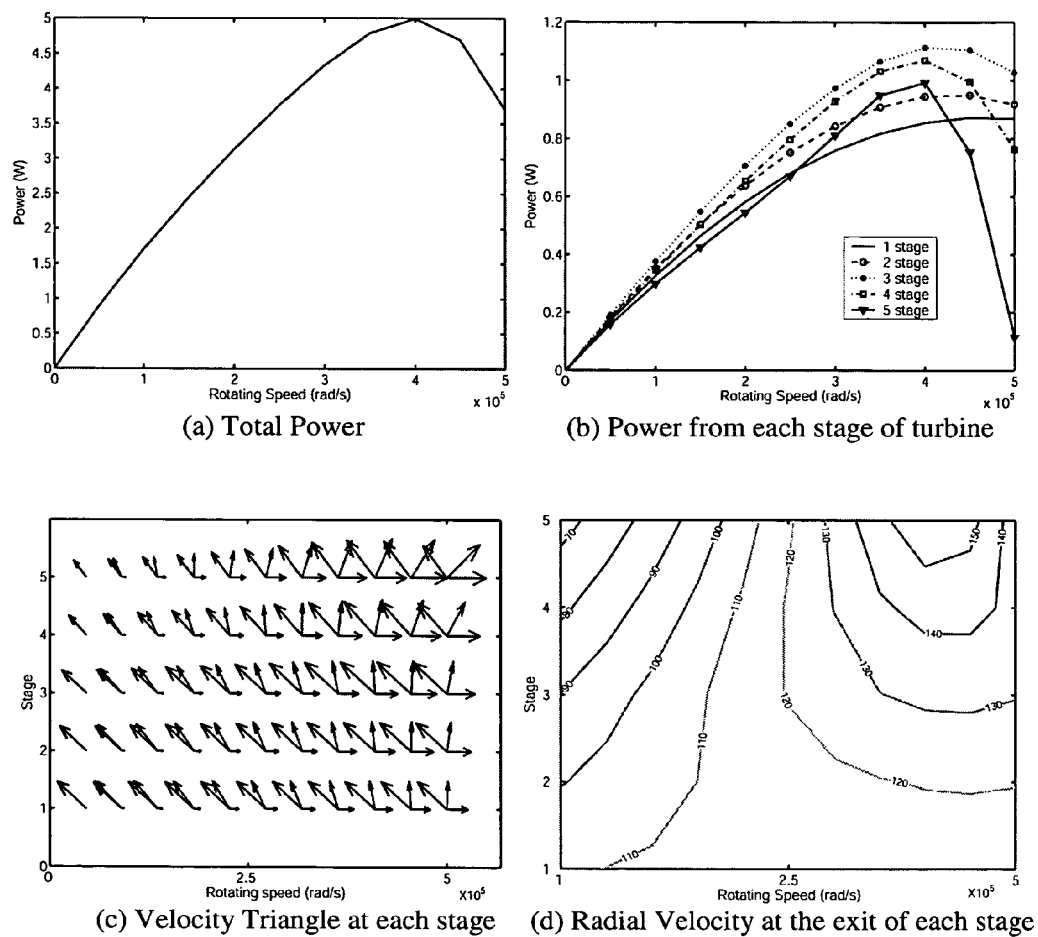
FIGS. 21A-21D show the performance of five-stage turbine in accordance with some embodiments of the present invention.

It should be noted that most stages have relatively flat curves, suggesting good robustness, except for the last stage (#6). Although its power output is more than any other stage, it occurs over a narrow range and drops dramatically at higher speeds to significant negative values. The flow velocity can also change very much and in some cases exceed the critical velocity. This implies that if the flow rate changes or heat transfer changes the fluid density, the power output can change drastically. By changing the geometry of the sixth stage of the turbine, this problem can be avoided. But in a stable condition, the last stage does not produce as much power, and is simply removed. FIG. 21 and Table 2 show the performance of the resulting five-stage turbine.

TABLE 2

Baseline design of 5 stage turbine at the inlet condition of 400° C., 0.6 MPa.

| | $1^{st}$ stage | $2^{nd}$ stage | $3^{rd}$ stage | $4^{th}$ stage | $5^{th}$ stage |
|---|---|---|---|---|---|
| Inlet Pres. (MPa) | 0.6 | 0.49 | 0.40 | 0.31 | 0.24 |
| Inlet Temp. (°C.) | 400 | 382.14 | 362.35 | 338.98 | 316.39 |
| Exit Pres. (MPa) | 0.49 | 0.40 | 0.31 | 0.24 | 0.18 |
| Exit Temp. (°C.) | 382.14 | 362.35 | 338.98 | 316.39 | 295.29 |
| Chord length (µm) | 20 | 20 | 24 | 36 | 50 |
| Angle ($\alpha$) | 60 | 60 | 60 | 60 | 60 |
| Angle ($\beta$) | 60 | 60 | 60 | 55 | 50 |
| Power (Watt) | 0.8582 | 0.9482 | 1.1164 | 1.0726 | 0.9959 |

| | |
|---|---|
| Inner radius of turbine ($\mu m$) | 360 |
| Outer radius of turbine ($\mu m$) | 760 |
| Rotational speed | $4 \times 10^5$ rad/sec (tip speed of 305 m/s) |
| Total Power (Watt) | 5 |

This level of power is lower than required for the high pressure and high temperature cycles. Increasing the number of stages further introduces large mismatch in wheel tangential velocity at the inner and outer stages, increasing the stage matching challenges. An alternate approach consists of using multiple rotors, as discussed next.

An alternate approach to adding more stages on one rotor consists of distributing the stages over multiple, independent rotors, as commonly done in traditional gas turbines. Rotors would be located side-by-side, in the same plane, with the entire steam stream flowing sequentially through each turbine (i.e. in series). Each multistage turbine therefore extracts a fraction of the total power output, for the same flow rate. This configuration allows each rotor to be limited to a few stages and conservative operating velocities, while enabling higher power levels per unit mass flow. After discussing some benefits and drawbacks, a preliminary multi-spool turbine design is presented. Results show that high power levels, 28 Watts for 24 mg/s in this case, can be achieved.

Benefits (1) Increased power with conservative turbine design—Since the chip size is mostly defined by the heat exchangers, sufficient space is available to house multiple rotors, without increasing the chip size. For example, four (4) rotors mounted with turbines similar to that described above (~5 watts each, 2 mm diameter), could produce ~20 watts and occupy only a total of ~¼ of the 1 cm² nominal chip area.

(2) Independent rotational speed—Each rotor can operate at a different rotational speed that is most appropriate for the inlet steam conditions;

(3) Ease of microfabrication—Since the features are created in parallel using lithography and etching, fabricating arrays of micro-turbines instead of a single rotor does not add fabrication complexity. This approach is therefore especially well suited for microfabrication.

(4) Inter-stage re-heating—Choosing this approach also enables re-heating of the steam between stages. Re-heating typically increases the cycle efficiency for the same heat sink and source temperatures.

(5) Design and operational complexity—Most items listed previously can improve the system performance and/or efficiency, but to the cost of more challenging design and operation of the microsystem due to the added complexity.

(6) Heat loss between stages—Depending on the flow path design and location with respect to the heat exchangers, the working fluid may gain heat (Inter-stage re-heating, as discussed above) or loose heat. The system efficiency and output power may be adversely affected if the fluid is effectively cooled between rotors. Proper thermal design is therefore critical.

Multi-Spool Configuration

Figure 22:
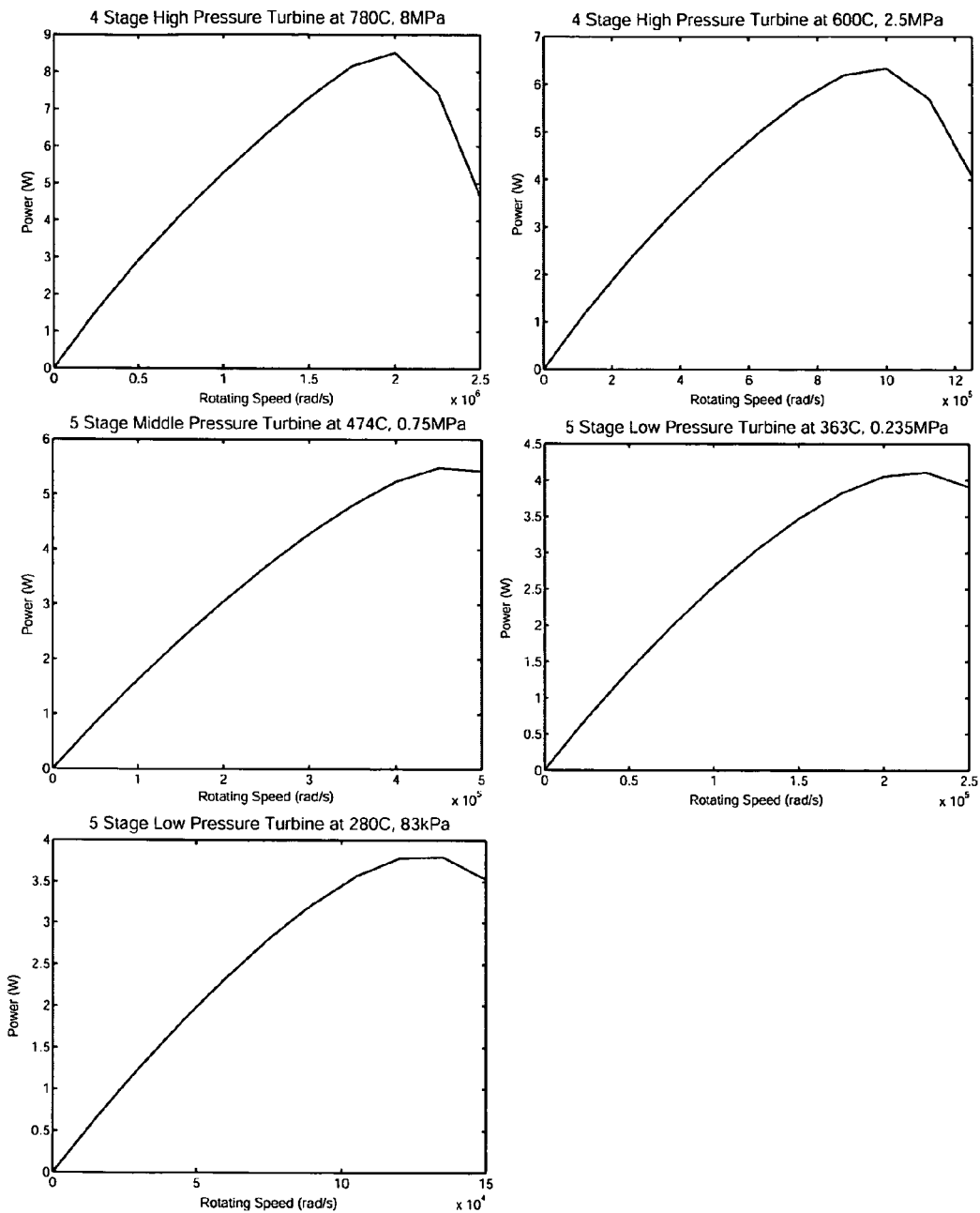
FIG. 22 shows the power output of each multi-stage turbine as a function of operating speed for a multi-spool configuration with five rotors in accordance with some embodiments of the present invention.

To maximize the efficiency and power output of the system, the steam at inlet of the turbine should have high pressure and temperature. In this analysis the maximum inlet temperature and pressure of the first turbine are 780° C. and 8 MPa. To draw out as much energy as possible and reduce the pressure to 10's of kilopascals, multiple turbine rotors are designed, varying from high-pressure turbines to low-pressure turbines. Table 3 and FIG. 22 show the configuration and power output of five successive turbines in which the inlet conditions of each turbine and the outlet condition of the upstream turbine in accordance with some embodiments of the present invention. The total power output extracted from the five turbines is about 28 Watts, on the order of what is required for high performance cycles. The power output for each turbine shows that the high-pressure turbines produce more power than low-pressure turbines, as expected since the power is proportional to the inlet total temperature when the pressure ratio is kept constant. This design exercise confirms that high power levels can be expected, even with conservative aerodynamic design constraints.

TABLE 3

Geometries and conditions of five successive turbines for multi-spool configuration.

|  | 1st turbine | 2nd turbine | 3rd turbine | 4th turbine | 5th turbine |
| --- | --- | --- | --- | --- | --- |
| Inlet Pres. (MPa) | 8 | 2.5 | 0.75 | 0.235 | 0.083 |
| Inlet Temp. (°C.) | 780 | 600 | 474 | 363 | 280 |
| Exit Pres. (MPa) | 2.5 | 0.75 | 0.235 | 0.083 | 0.03 |
| Exit Temp. (°C.) | 600 | 474 | 363 | 280 | 202 |
| Chord length (µm) | 11 | 20 | 20 | 60 | 80 |
| Blade height (µm) | 15 | 25 | 50 | 80 | 130 |
| Inner radius (µm) | 80 | 150 | 300 | 500 | 900 |
| Outer radius (µm) | 258 | 430 | 652 | 1200 | 1800 |
| Tip speed (m/s) | 516 | 430 | 326 | 240 | 225 |
| Radial exit Vel. (m/s) | 157 | 162 | 146 | 124 | 116 |
| Angles (deg.) | 60 | 60 | 60 | 60 | 60 |
| Re No. (Tip Vel.) | 493 | 977 | 988 | 3064 | 5806 |
| Re No. (Rad. Vel.) | 150 | 368 | 442 | 1583 | 2993 |
| Max. power (W) | 8.4 | 6.3 | 5.4 | 4.2 | 3.8 |

Prospects of Microturbine Power Levels

It should be noted that the current preliminary design has been intentionally constrained to conservative operating conditions in order to mitigate the development risk of such an innovative technology. It is however interesting to consider the prospects for such a technology, once it has reached a mature stage. Simple calculations of turbine power output for a single stage can provide such foresight. The turbine power is defined as the torque, given by the angular momentum conservation equation, multiplied by the rotation rate: $P=T \cdot \Omega = \Omega \cdot \dot{m} \cdot \Delta(r \cdot V_\theta)$. Assuming that the radius change is substantially negligible, the power per unit flow rate scales as a characteristic velocity squared: $P/\dot{m} \approx \Omega r \cdot \Delta V_\theta \propto U^2$. Table 4 shows the result for single stage microturbines operating at mass flows and velocities typical of microengines currently being investigated. Power levels vary from about 1 Watt per stage for the device studied here. The lower power level of the current steam turbine compared to other microengines simply results from the lower flow rate, chosen to enable sufficient external heat transfer over the 1 cm² chip area, and the lower operating velocities, chosen to increase robustness, facilitate bearing development and hence mitigate development risks. In the current analysis, most operating parameters were kept at conservative levels, such as the maximum flow Mach number (<0.7) and relative flow angle (<60 deg). Although more aggressive aerodynamic design would be possible, the multi-spool approach offers an interesting alternative, especially at these early stages of microengine technology development.

TABLE 4

Sample calculation of turbine power for typical operating conditions for microturbines.

| Mass flow | Characteristic 250 m/s | Velocity, U 500 m/s |
| --- | --- | --- |
| 0.024 g/s | 1.5 W | 6 W |
| 0.1 g/s | 6 W | 25 W |
| 0.4 g/s | 25 W | 100 W |

Microturbomachinery Aerodynamics

To this point, turbine design investigations have been based on a meanline analysis, assuming a turbine efficiency to be 70%, based on previous computational analyses and experimental results for an air turbine developed at MIT. Four main aspects will require further investigation: 1) effect of scale and 2D geometry on turbine efficiency (blade profile losses); 2) maximum blade loading at low Reynolds numbers, to define design limitations for power levels per stage; 3) effect of non-adiabatic operation and impact on robustness; and 4) three-dimensional and secondary flows, such as tip clearance, hub and shroud boundary layers, and non-uniform inlet flow.

The approach consists of using a combination of analytical and CFD tools to assess the impact of scale and shape on the efficiency, deviation, and blockage, then to review the meanline analysis with this updated information. Numerical studies have been undertaken using the Fluent commercial CFD software. Since the flow field is expected to remain laminar due to the low Reynolds numbers, well established numerical methods for the Navier-Stokes equations are expected to be appropriate. Initial calculations indicate that the flow remains attached at these angles, deviation is minimal, and the flow is generally well behaved. Further 2D profile studies will investigate the effect of scale (hence Reynolds number) on the relative total pressure loss coefficient, blockage due to boundary layer thickness, and deviation.

Figure 23:
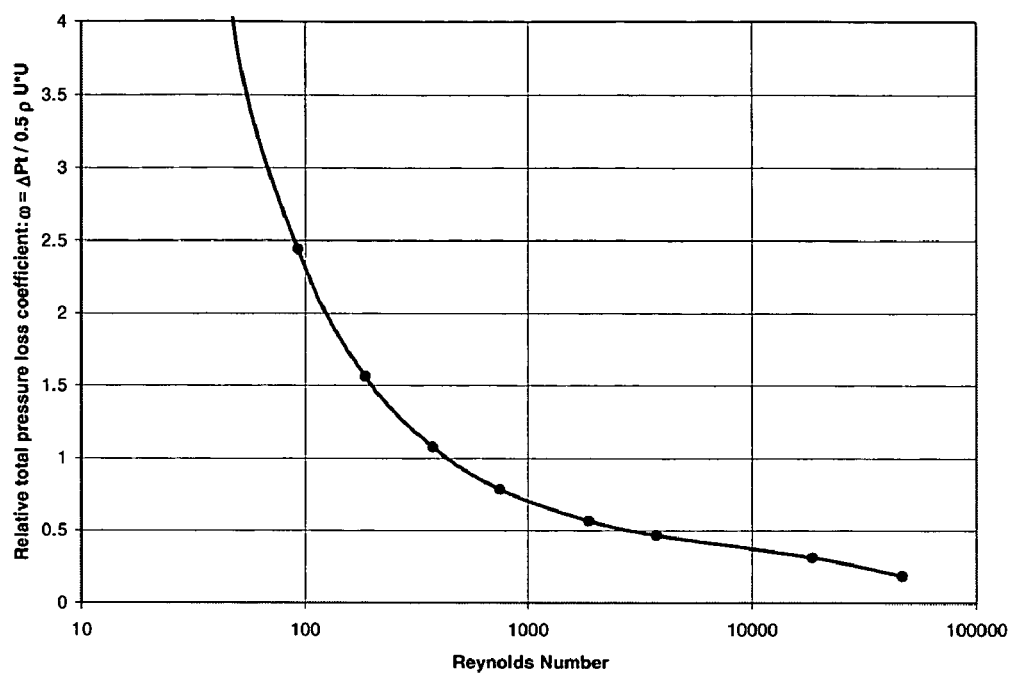
FIG. 23 shows the effect of Reynolds number on blade profile losses in accordance with some embodiments of the present invention.
Figure 24:
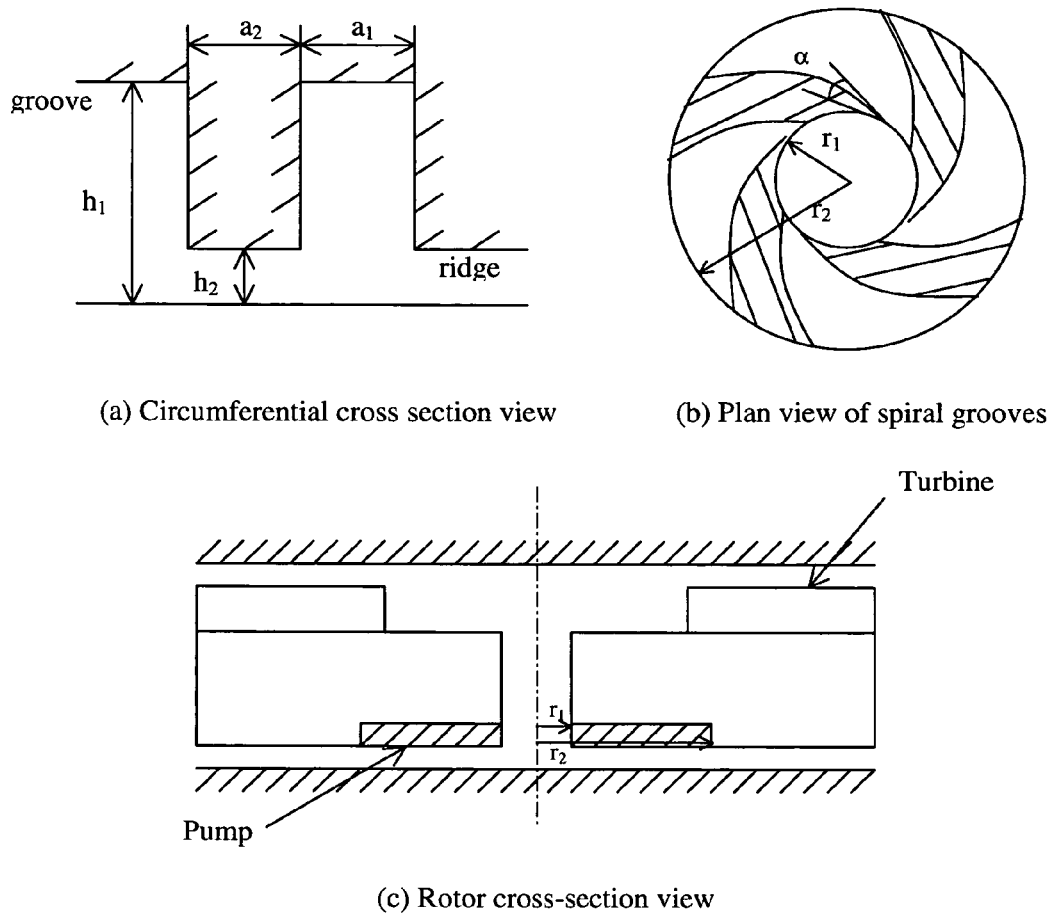
FIGS. 24A-24C are simplified illustrations of a spiral groove viscous pump (less grooves shown for clarity) in accordance with some embodiments of the present invention.

There is an intrinsic trade-off between power level and efficiency, which will need to be balanced through cycle analysis. Issues to be considered include:

Low Reynolds number: The proposed microdevice is characterized by small blade chords, which lead to lower Reynolds numbers (ranging from 100 to 10,000) and consequentially, lower turbine efficiency. FIG. 23 illustrates the effect of Reynolds number for a representative blade for the multistage microturbine considered here (based on CFD results), suggesting that the Reynolds number should remain above a few hundred. In order to increase the Reynolds number and mitigate the profile losses, high flow velocities are desirable, leading to high tangential speeds. In order to get significant flow velocities, the through flow area may be kept small, pushing designs at small radii. The mass flow rate cam also be increase in order to scale up the device.

Flow field three-dimensionality: Although the geometry is two-dimensional, the flow field is expected to be three-dimensional due to the presence of hub boundary layers and tip clearance flows. Throughout the entire device, the flow may do 90 degree turns around sharp corner (constrained by microfabrication approach). This may incur a pressure drop penalty as well as result in non-uniform flow entering the turbine. Also, the blade aspect ratio (height to chord ratio) should be kept as high as possible to minimize the percentage of secondary flow regions to the core flow. However, higher blades will further increase the flow area, reducing the flow velocities, and the potential power extracted.

Blade loading: In the analysis presented herein, the turbomachinery aerodynamics are kept relatively conservative. More detailed aerodynamic investigations and analysis would be beneficial at defining the actual design limitations for low Reynolds number, planar turbomachinery, and potentially allowing increased power, efficiency, and robustness.

Tip Clearance: Tip clearance losses may also be limited by proportionally scaling down the clearance with the blade height. Smaller clearance however induces increased viscous friction losses. An appropriate trade-off may therefore be made in determining the tip clearance, between tip viscous drag and tip clearance leakage losses.

Blade spacing: Since viscous drag tends to become relatively important at lower Reynolds numbers, it is beneficial to reduce the wetted area by reducing the total number of blades for example. There is a trade-off between power per stage and efficiency, since although a lower number of blades may decrease the viscous losses; this may result in lower turning (hence power per stage) and potentially blade separation.

Pump

Two types of pumps were initially considered for the Rankine device: 1) turbomachinery-based pumps, and 2) viscous pumps. Given the very small volumetric flow rate of the working fluid in liquid form (1500 times less than in vapor phase), Reynolds numbers are very low and momentum-based pumping principles, such as turbomachinery, become increasingly less efficient. Furthermore, the very small scale (orders of magnitude smaller than the turbine described above) deem the turbomachinery approach to be impractical from a fabrication standpoint. Given the non-stringent requirement on pump efficiency (as described in the Cycle Analysis section earlier), a spiral groove viscous pump was found to be preferable and was designed for this application.

Figure 26:
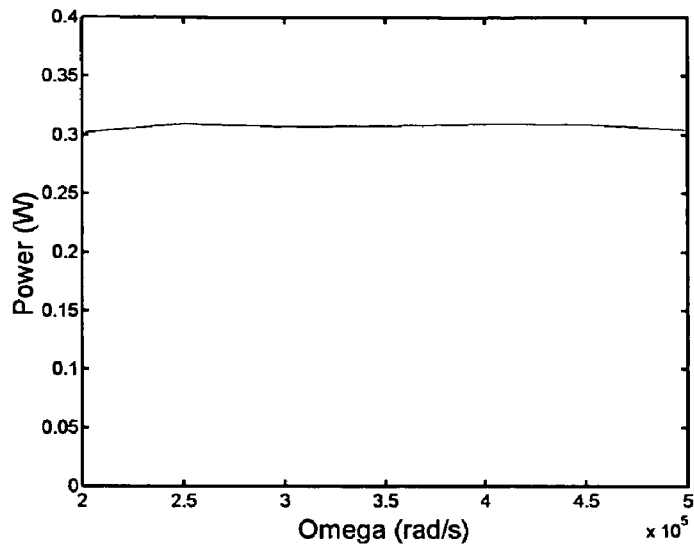
FIG. 26 shows power consumption for spiral grooved pumps optimized for each different angular velocity, for the same pressure rise and mass flow, in accordance with some embodiments of the present invention.

This section presents the analysis and optimized design of the viscous pump, which is predicted to deliver 24 mg/s of water with a pressure rise of 0.6 MPa, consuming only 0.3 W. High pressure designs are also presented, demonstrating efficiencies of 4-5%. The design is directly inspired from hydrodynamic spiral groove thrust bearings, with a center port added to collect the pressurized fluid. The geometry consists of a grooved surface with shallow trenches spiraling inward at a constant spiral angle, parallel to a smooth surface. Either surface is rotating. In FIG. 26, the grooves are etched in the rotor. The geometry and variables are as follows:

Symbols $\dot{m}$: mass flow rate (kg/s) $\mu$: viscosity (N s/m$^2$)

$\omega$: angular velocity (rad/s) $\rho$: density (kg/m$^3$)

$\alpha$: angle of spiral groove $h_1$: gap between groove and bottom (m)

$h_2$: gap between ridge and bottom (m) $r_1$: inner radius (m)

$r_2$: outer radius (m) $a_1$: groove width (m)

$a_2$: ridge width (m) $\gamma$: $a_2/a_1$ $\lambda$: $r_1/r_2$ H: $h_2/h_1$

Traditionally, spiral groove thrust bearings and other lubricating flows have been designed and analyzed using the Reynolds equation, which assumes fully developed viscous flow and uniform pressure and density across the thickness of the lubricating film. This approach, with the inclusion of radial flow, is applicable for the microscale viscous pump. The pressure rise, torque and power consumption as a function of geometry, rotational speed and flow rate are determined:

Pressure Rise Equation:

$$\Delta P = \frac{3\mu\omega}{h_2^2}(r_2^2 - r_1^2)g_1(\alpha, H, \gamma) - \frac{6\mu\dot{m}(1+\gamma)}{\pi\rho h_1 h_2^2} A \ln\left(\frac{r_2}{r_1}\right)$$

$$g_1(\alpha, H, \gamma) = \frac{\gamma H^2 \cot\alpha(1-H)(1-H^3)}{(1+\gamma H^3)(\gamma + H^3) + H^3\cot^2\alpha(1+\gamma)^2}$$

$$A = \frac{H^2(1+\cot^2\alpha)(\gamma + H^3)}{(1+\gamma H^3)(\gamma + H^3) + H^3\cot^2\alpha(1+\gamma)^2}$$

Torque Equation:

$$T = \frac{\pi\mu\omega r_2^4}{2h_2}(1-\lambda^4)g_2(\alpha, H, \gamma) - B(r_2^2 - r_1^2)\frac{\mu\dot{m}}{\rho h_1 h_2}$$

$$g_2(\alpha, H, \gamma) = \frac{g_2*(\alpha, H, \gamma)}{1+\gamma}$$

$$g_2*(\alpha, H, \gamma) = (\gamma + H) + \frac{3\gamma H(1-H)^2(1+\gamma H^3)}{(1+\gamma H^3)(\gamma + H^3) + H^3 \cot^2\alpha(1+\gamma)^2}$$

$$B = \frac{3\gamma H \cot\alpha(1-H)(1-H^3)}{(1+\gamma H^3)(\gamma + H^3) + H^3 \cot^2\alpha(1+\gamma)^2}$$

Power:

$$P = T \times \omega$$

In order to determine the geometry that provides the desired pressure rise with the least power consumption, an optimization process is needed. According to other studies, the configuration is optimized for a spiral angle of $\alpha=15°$ and a groove/ridge width ratio of $\gamma=1$, independently of the other parameters. Therefore, the set of variables $\{\alpha, \gamma, h_1, h_2, r_1, r_2\}$, which defines a geometry can be reduced from 6 to 4: $\{h_1, h_2, r_1, r_2\}$, and the pressure rise and power become the functions of those 4 geometric variables as follows:

$$\Delta P = f_1(H, h_2, r_2, \lambda), \text{Power} = f_2(H, h_2, r_2, \lambda)$$

where, $r_1$ and $r_2$ can be replaced with H and $\lambda$. The range explored for each variable was: $0.02 \leq H \leq 0.4$, $0.5 \mu m \leq h_2 \leq 10 \mu m$, $0.05 mm \leq r_2 \leq 1.5 mm$, $0.04 \leq \lambda \leq 0.8$. Water was used as the working fluid, and the properties on T=75° C. and Pressure=38 kPa, and the flow rate are: $\dot{m}=24$ mg/s, $\mu=370\times10^{-6}$ Ns/m$^2$, $\rho=974$ kg/m$^3$.

The optimization process consisted of choosing a rotational speed, then calculating the pressure rise and power for the entire set of design parameters. The optimum design was then found by searching for the design with least power consumption, while delivering a pressure rise in the desired range. Because every point in the design space is evaluated, the optimum point can be considered as the global optimum.

Table 5 shows the optimized geometry and performance of pumps at 0.6 MPa and 8 MPa. In both cases the efficiencies are not so different from each other. Normally it averages to 4.5%, and the power consumed by each pump is therefore proportional to the product of mass flow and pressure rise. This design exercise demonstrates that spiral groove viscous pumps are a promising approach for microscale systems. The efficiency is acceptable over a wide range of design pressures, the geometry is readily produced with microfabrication, and the scale is compatible with the other components.

TABLE 5

Optimized configurations of low pressure and high pressure viscous pumps.

| ΔP | 0.6 MPa | 8 MPa |
|---|---|---|
| ω | 4 × 10$^5$ (rad/s) | 4 × 10$^5$ (rad/s) |
| angle | 15 (deg.) | 15 (deg.) |
| H1 | 4.61 (μm) | 3.12 (μm) |
| H2 | 0.6 (μm) | 0.5 (μm) |
| R1 | 214 (μm) | 243 (μm) |
| R2 | 275 (μm) | 450 (μm) |
| Power | 0.345 (Watt) | 4.60 (Watt) |
| Efficiency | 4.34 (%) | 4.25 (%) |

Figure 25:
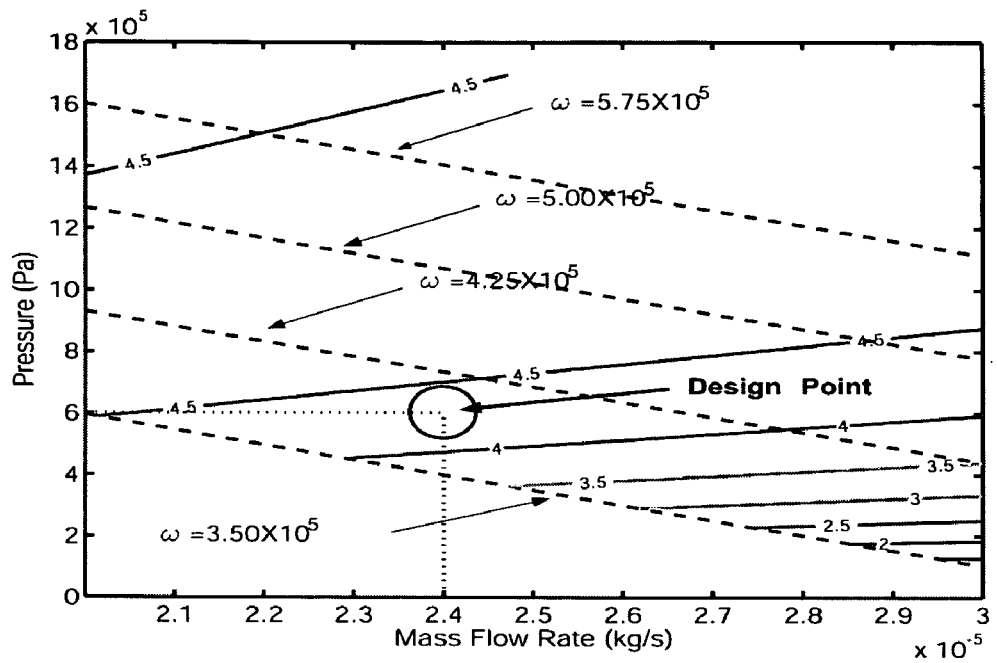
FIGS. 25A and 25B show pump characteristic curves: pressure rise (dashed lines) and efficiency contours (solid lines) as a function of mass flow rate and speed for the low pressure and high pressure designs in accordance with some embodiments of the present invention.
Figure 25:
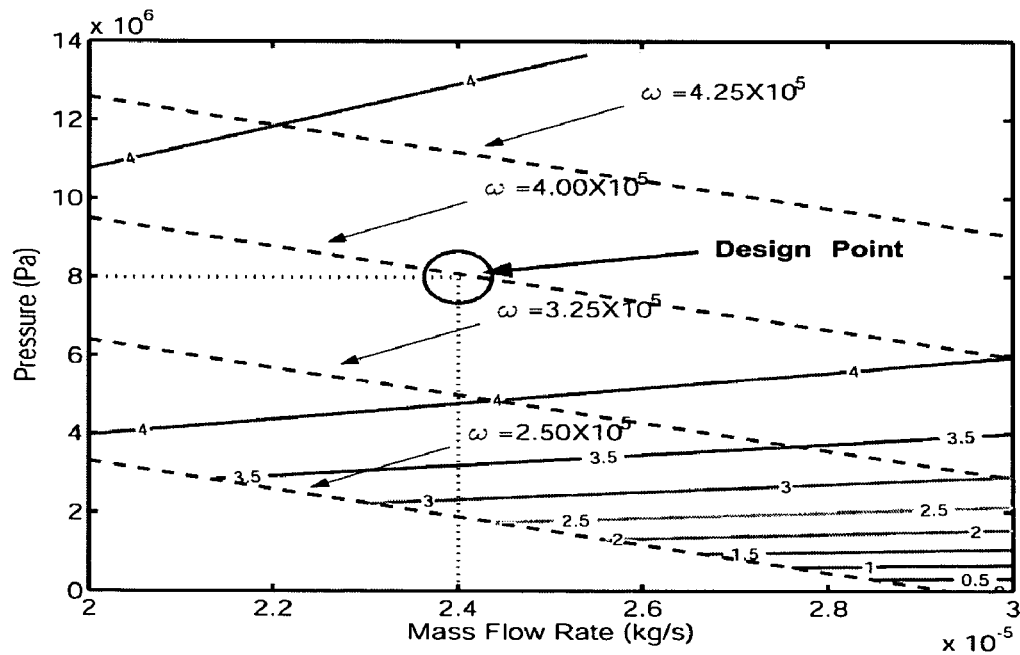

The pumping curves for both designs are shown in FIG. 25, with both the pressure rise curves for different rotational speeds (dashed lines) and efficiency contours (solid lines, labeled in percentages). As shown in FIG. 26, the power of an optimized geometry changes very slightly regardless of the rotational speed chosen for the optimization. This suggests that a viable viscous pump design would be achievable for a wide range of design speeds.

It should be noted the pressure rise of turbomachinery-based pumps is typically limited by cavitation since local acceleration of the liquid reduces the pressure below saturation, which promotes the formation of vapor bubbles. This behavior has been shown to be similar in microscale turbomachinery passages (100 s of microns) than at traditional scales. From its underlying principle of operation, the viscous pump does not lead to local acceleration since inertial effects are minimal. Instead, the fluid is driven by the shear forces from the moving surface and constrained to move at velocities lower, or equal, to it. Pressure within the pump is gradually increasing and does not lead to low pressure regions. These arguments suggest that cavitation is not expected in viscous pumps.

It should also be noted that as the flow enters the viscous pump and first comes onto contact with the moving surface, it may experience sharp changes in velocity. The entrance region of the pump may therefore be analyzed further to evaluate the entry length, the associated pressure drop, and potential low pressure areas that may lead to cavitation. Entrance losses would tend to degrade the pressure rise at high mass flows, an effect that was not included in the pumping characteristics of FIG. 25.

Heat Exchangers

In the Rankine cycle device considered here, heat needs to be added and removed from the working fluid through heat exchangers, the evaporator and the condenser respectively. They each consist of two main parts: microchannel two-phase flow heat exchangers through which the working fluid travels, and the external heat transfer surface in contact with the heat source or heat sink. The surfaces of the chip are the interface between the internal and external parts of the heat exchangers. In the case where convection is used to provide/remove the heat to/from the chip, the external part of the heat exchanger is limiting, since flow boiling in the internal microchannels provides higher heat transfer rates, hence requiring less area. External heat sink optimization, as is known in the art, suggests that it is possible to remove 50-100 Watts of heat per cm$^2$ by forced air convection with less than 1 Watt of fan power. In this section, an external fin array will be evaluated to minimize this thermal resistance then the internal two-phase flow part of the heat exchangers will be considered.

Figure 27:
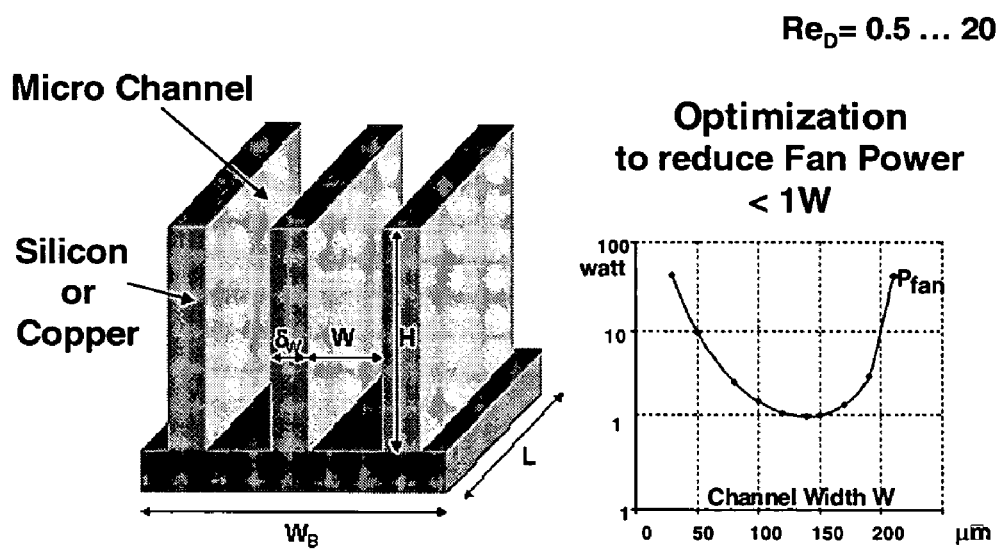
FIG. 27 shows the external finned heat sink optimization for minimal fan power required in accordance with some embodiments of the present invention.

As shown in the cycle analysis section, cooling the condenser is critical and promoting the high heat flux will be challenging. Heat transfer coefficients and rates increase at small hydraulic diameter channels, but to the cost of increased pressure drop. Although in-flight applications could use the air flow around the aircraft for cooling, ground or in-cabin applications would require a fan to provide force convective cooling. A design study was performed to assess the trade-off between increased heat transfer rates and power required to drive the coolant airflow for the ground application, based on previous work. With ambient air at 25 C, an optimized Rankine cycle condenser temperature of 93.5° C. and finned heat sink configuration were found that required less than 1 W of power for the external cooling fan. This suggests the potential use of this technology for in-cabin or ground power generation, with proper external heat exchanger design. The specific design of an external fin array is best performed according to a very specific implementation. (See, e.g., FIG. 27).

The internal portion of the heat exchangers consists of two-phase flow microchannels that are directly integrated on-chip with the other components. They may provide a steady flow of superheated with limited pressure drop. The two-phase flow micro heat exchangers are significantly challenging, novel, and critical components that need to be developed for the micro steam turbine engine. Microscale two-phase flow is an active research area these days, mostly focusing on electronic cooling. Flow phenomena are poorly understood at this small scale and validated modeling approaches have not yet been developed. Although multiple researchers have studied flow boiling in microscale geometries and that very high heat transfer rates have been achieved, stable operation in super heated conditions were rarely achieved. Current efforts of other researchers mostly focus on the flow physics at small scales, but not on the design of appropriate shaped channels for high through flow, low pressure drop requirements. Typically dry-out, bubbles, and unsteady flow phenomena prevent stable superheated operation.

Figure 28:
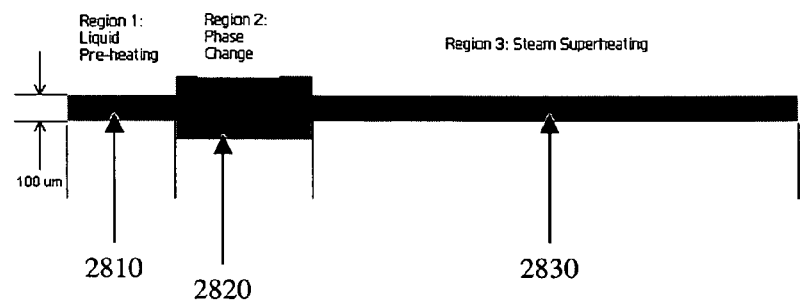
FIG. 28 shows regions of a microchannel evaporator with superheating for preliminary analysis purposes in accordance with some embodiments of the present invention.

The design approach taken here therefore consists of using traditional relations for the single-phase flow regions and experimental investigations for the more complex two-phase flow region. Design of the microchannel two-phase flow heat exchangers can be divided into three regions (e.g., regions 2810, 2820, and 2830), as illustrated in FIG. 28. The first segment 2810 is the upstream region where the temperature of the water is increased until it starts to boil. The second region 2820 consists of converting the water to steam. The third region 2830 consists of superheating steam. The middle region 2820 is the most difficult region to study theoretically because it involves two-phase flow in microchannels, while the upstream and downstream regions 2810 ad 2830 are amenable to traditional internal flow heat transfer modeling. Based on the cycle analysis of the two applications for the steam turbine power plant, a baseline study of the dimensions of the heat exchangers has been conducted.

First Order Modeling Approach—Regions 1 and 3:

In order to estimate the space on the chip required for the two-phase flow heat exchangers, first order analysis of the heat transfer rates and required length at determined for each region, based on the desired temperature for the in-flight and ground operating conditions, described above in FIG. 9. For first-order analysis, the channels are assumed to be straight and rectangular, each 50 microns high. The number of channels and width of the channels is varied and the length is determined for each width. The channels will originate near the center of the chip and move out radially. The amount of chip area is a design constraint, so a circle with a circumference of 10 mm is assumed to be the starting point for the array of channels. If there is 20-micron thick wall between each channel, it is possible to determine the width of each channel based on the number of channels. For example, if 100 channels is desired, Numbers of channels*(Width of each channel+Width of wall)=Circumference 100*(Width of each channel+20*10$^{-6}$ m)=0.01 m Width of each channel=80 microns For a given channel size, a total mass flow of 0.024 g/s of water, and the appropriate fluid properties, the thermal and hydrodynamic conditions are calculated. In all cases and regions, the Reynolds numbers are found to be less than 2000, such that the flow can be assumed to be laminar throughout.

Heat Transfer

For the most general case of a combined entry length (thermal and viscous boundary layers developing), the following correlation is used to determine the Nusselt Number, Nu:

$$Nu = 1.86 * \left(\frac{\text{Re}\,\text{Pr}}{L/D_h}\right)^{1/3} \left(\frac{\mu}{\mu_s}\right)^{0.14}$$

where x=L is the channel length, $D_h$ is the hydraulic diameter, Pr is the Prandtl number, and $\mu$ is viscosity. As a baseline study, $$\frac{\mu}{\mu_s}$$

is assumed to equal one. Once the Nusselt number determined, the average convection heat transfer coefficient can be solved from:

$$h = \frac{Nu\,k}{D_h}$$

where k is the fluid thermal conductivity. With the convection heat transfer coefficient, the length of the channel can be solved using the energy balance equation.

$$\Delta T_{lm} h A_s = m c_p (T_o - T_i)$$

where $A_s$ is the surface area of the channel and $\Delta T_{lm}$ is the log mean temperature difference. The following relationship for the required channel length emerges after combining with the energy conservation equation and after manipulation:

$$L = \left(\frac{m \cdot c_p}{2.862 \cdot k}\right)\left(\frac{T_{m,o} - T_{m,i}}{\Delta T_{lm}}\right)^{3/2} \left(\frac{D_h}{P}\right)^{3/2}$$

where the log mean temperature difference is defined from the channel inlet and outlet temperature differences, $$\Delta T_{lm} = \frac{\Delta T_o - \Delta T_i}{\ln(\Delta T_0 / T_i)}.$$

This equation therefore solves for length as a function of mass flow, inlet and outlet temperatures, hydraulic diameter, and perimeter, for region 1 and region 3. These results were based on the use of traditional relations of laminar flow with a combined entry length and constant wall temperature.

Pressure Drop

Once the channel length has been determined, the pressure drop across the channel can be calculated. Using the ratio of the height to the width of the channel, the friction factor of the channel may be determined. The pressure drop is then determined assuming fully developed flow, by using:

$$\Delta P = f \frac{\rho v^2}{2D_h}(x_2 - x_1),$$

where $x_2-x_1$ is the length, f is the friction factor, and v is the average flow velocity.

Results—Regions 1 and 3:

Region 1—For in-flight operation, as water exits the pump, it is at 11.1° C. and has a pressure 501 kPa. It will start to boil when its temperature reaches 152° C., requiring 14 W of heat. The wall temperature of the heat exchanger is assumed to be 600 C. The fluid properties, such as density, viscosity, thermal conductivity, and specific heat, are evaluated at the log mean temperature, 85° C. For ground operation, water exits the pump at 93.5° C. and 700 kPa. It will start to boil when its temperature reaches 165° C., requiring 7.0 Watts of heat. The wall temperature of the heat exchanger is again assumed to be 600° C.

Region 3—For in-flight operation, steam is starting at 152° C. and needs to be superheated to 400° C. The wall temperature is assumed to be 600° C. and the pressure of the steam is assumed to be 501 kPa. The mass flow is held constant at 0.024 g/s. The same correlations are used as for region 1, but the fluid properties are evaluated at the log mean temperature that is 292° C. For ground operation, the steam will be at 700 kPa and will require 12.0 Watts of heat to superheat to 400° C.

Figure 29:
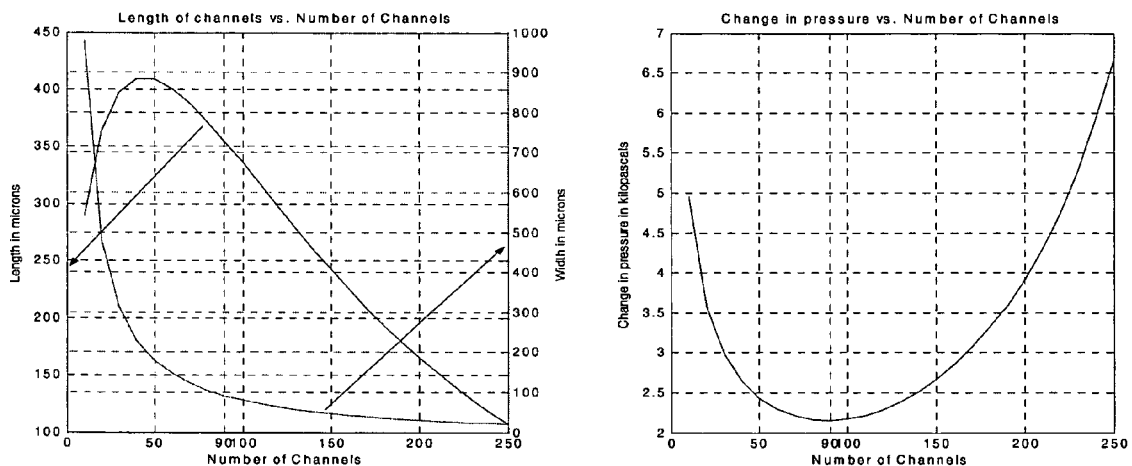
FIG. 29 shows the required channel length for superheating in region 3 and the resultant pressure drop as a function of the number of channels in accordance with some embodiments of the present invention.

For both operating conditions (in-flight and ground), the required channel lengths for superheating (region 3) are on the order of 100 to 400 microns, while the length required for pre-heating (region 1) is calculated to be significantly less. A typical calculation or required length for superheating is shown in FIG. 29. The graph on the left show lengths of channels required as the width and number of channels is varied. The graph on the right shows the change in pressure as the number of channels is varied. The optimal choice is where the lowest pressure drop occurs, which is using approximately 90 channels (for a fixed channel depth of 50 microns).

Entry Lengths (Developing Flow)

Another factor of importance is the thermal entry length, which for laminar flow can be calculated by: $x_{td}=D_h*0.05*Re*Pr$. For the geometry of lowest pressure drop identified previously, the entry length in the superheating channel (region 3) is predicted to be on the order of 80 micron, approximately 25% of the channel length.

In the pre-heating channels (region 1), prediction of the thermal entry length indicates that it is significantly longer than the channel lengths calculated. In this case, the fluid closer to the walls of the channel will heat up faster than the fluid in the center of the channels. This may cause bubbles to form along the walls that can then clog the channel. To prevent this from occurring, in some embodiments, the channel includes small fins that are dispersed throughout it. These fins help heat up the fluid that is in the center of the channel. In addition, the length of Region 1 is much smaller in comparison to the width and height, indicating that it may be possible to combine Region 1 and Region 2.

Region 2—Two-phase Flow Region

Figure 30:
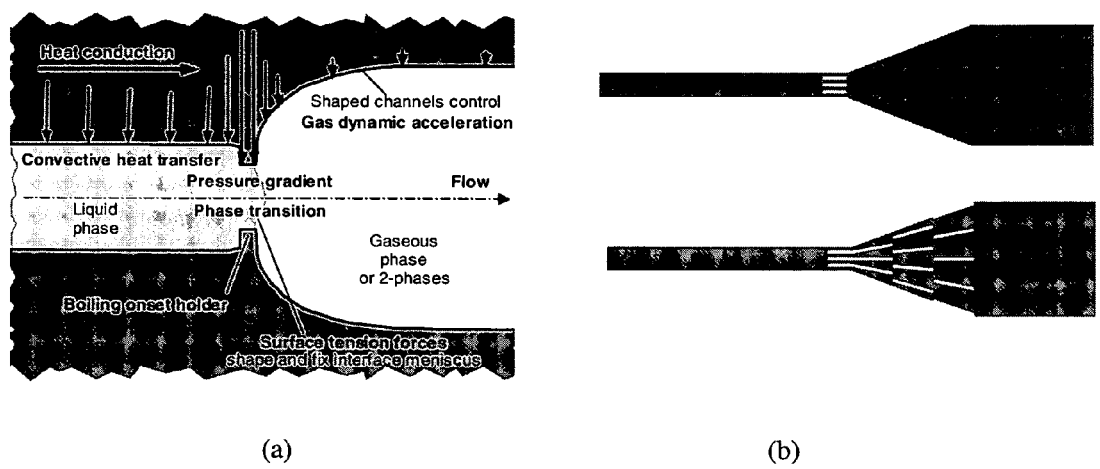
FIGS. 30A and 30B are simplified illustrations of internal flow boiling in shaped channels, which control the onset of boiling and the gaseous-phase acceleration in accordance with some embodiments of the present invention.

Shaped microchannels may be utilized to: (1) constrain the vapor downstream of an ultra-high heat transfer region; (2) allow expansion of the lower density steam in a larger channel region; and, (3) prevents hot spots by designing for constant wall temperature instead of constant heat flux into the fluid. Since numerical and analytical modeling is not well established for this type in flow, an experimental approach has been adopted instead. FIG. 30 illustrates (a) the physical phenomena that may be leveraged and (b) two typical geometries that have been tested.

Alternate Heat Exchanger Layout

Given these assessments of the required microchannel lengths for the heat exchangers, the device layout may be better defined. In some embodiments, the total length of region 1 and region 3 is less than about 400 microns. If we assume that region 2 is about 100 microns long, each channel is approximately 500 microns long, which is very short considering the amount of area on the chip. If there are 90 channels that are 500 microns long and 100 microns wide, the total area of the channels is $45 \times 10^5$ microns$^2$, or 0.045 cm$^2$.

Since the area of the chip is 1 cm$^2$, the channels will be using only 4.5% of the surface area. This has important implications on the heat exchanger layout, since the heat flowing to the microchannels may come from the external heat exchanger, which spans the entire 1 cm$^2$. Heat distribution is therefore critical. This may be accomplished through conduction or convection, by distributing the channels over the entire chip area. In a distributed microchannel scenario, it will be difficult and impractical to transport the water or steam adiabatically between the rotor and the outer regions of the chip, as could be envisioned in a traditional scale system. Since the overall channel length is on the order of the wafer thickness, one can envision orienting the high heat flux microchannels perpendicular to the chip surface with parallel distribution plenums. Alternatively, the channels may be replaced with a layer of porous media. This configuration also suggests the use of impingement cooling and boiling, which also consists of flow perpendicular to the chip surface.

Bearings and Seals

Two types of bearings are used for the proposed device: thrust bearings for axial support and journal bearings for in-plane support of the rotor. This section first describes the approach for axial balance, followed by a discussion of approaches for in-plane support and sealing. In all cases, a fraction of the core pressurized flow is used to lubricate the bearings. These secondary flows and the forces induced are the main focus. It should be noted, however, that, in some embodiments, local pressures may be created in the bearings through hydrodynamic forces.

Axial Balance

The main axial forces include a pressure force acting downwards on the turbine side, an electromechanical attraction force in the generator acting downwards on the rotor, and other pressure forces from the bearings. For the current device, pressure forces on the turbine side dominate, hence a thrust bearing is needed at the bottom side to balance out the forces on the rotating disk. Here, the bottom side of the disk can be used as a thrust balance piston, by drawing a small fraction of flow from the turbine inlet. The flow extracted from the turbine flow gets into the bottom side through holes or slits on the disk, and comes out of the bearing past a flow restriction ($g_1$), as illustrated by the flow path in FIG. 31. The bearing surface between 3 and 4 consists of a simple circumferential protrusion that is used to control the fractional flow rate and the pressure distribution along the bottom side between point 2 and 3. Pressure gradually drops as the steam flows radially under the disk, then exhibits a sudden drop across the restrictor. Initially, the bearing restrictor is designed to balance out the other forces acting on the rotor, at a design axial position. At the given condition below, the flow rate for the bearing is 0.33% of the flow rate through the turbine when the gap $g_1$ is 1 micron.

Figure 31:
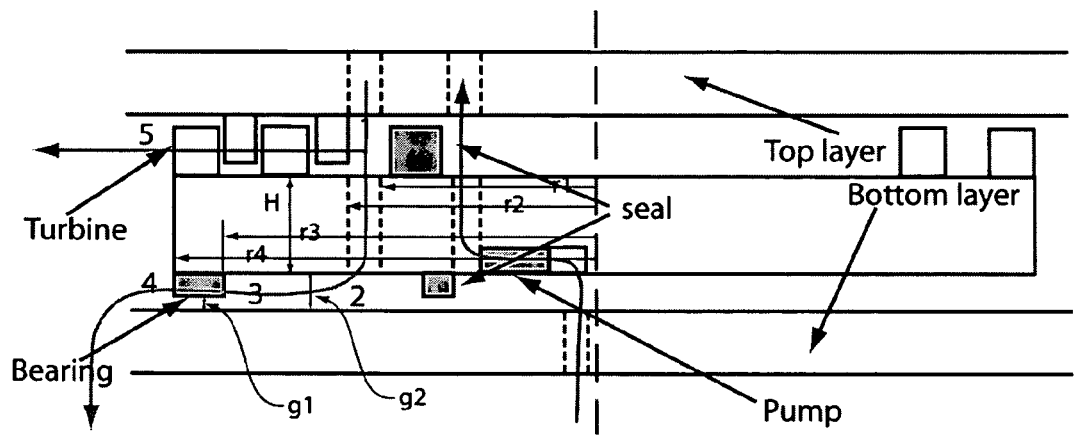
FIG. 31 is a simplified illustration of a cross-section schematic showing the liquid flow path (A) and steam flow path (B) through the main and secondary flow components in accordance with some embodiments of the present invention.
Figure 32:
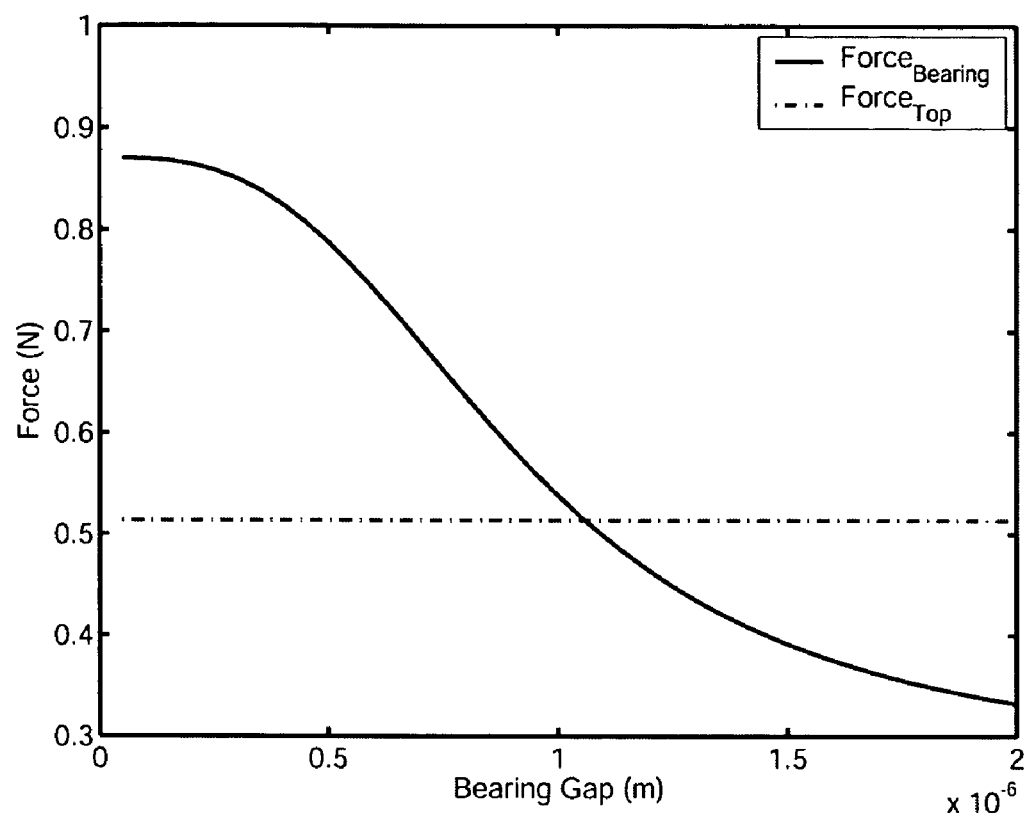
FIG. 32 shows the axial rotor balance, where a restoring force applied by the bearing as the rotor is displaced from equilibrium in accordance with some embodiments of the present invention.
Figure 33:
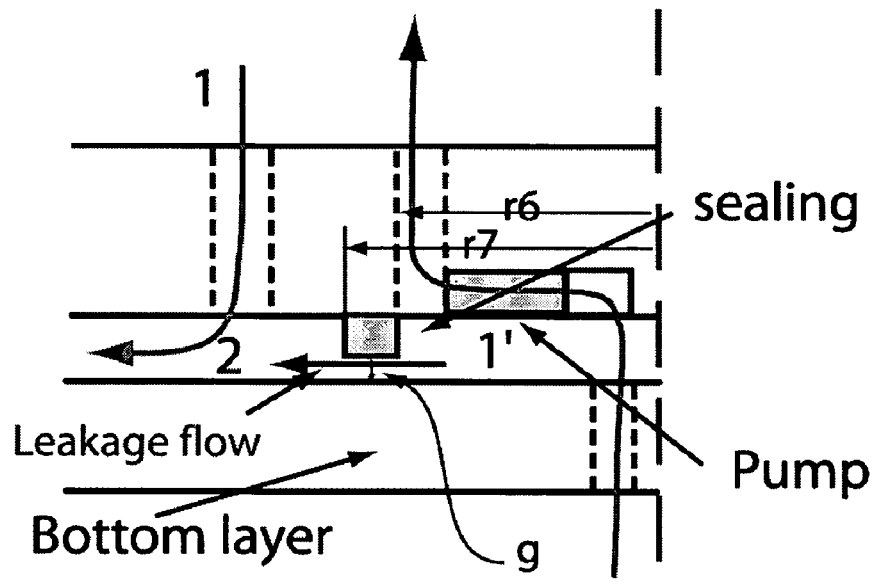
FIG. 33 is an simplified illustration of a schematic diagram of sealing between the pump and the thrust bearing in accordance with some embodiments of the present invention.

Stability requires that the bearing provide a restoring force when perturbed from the equilibrium point, which is the case for the proposed configuration. If the rotor is perturbed slightly downward, gap g1 of the restrictor will decrease leading to less flow under the disk. The radial pressure drop along the generator clearance will hence be decreased, leading to higher pressures on the back side. This larger upward force will restore the rotor towards its initial equilibrium position. This is illustrated in FIG. 31, which shows the net downward force (topside side) and the bearing side (bottom side) as a function of axial position (gap g1). Both forces are balanced at a gap of 1 micron. The bearing force changes significantly as a function of axial position of the rotor, while the force at the topside changes very little. This implies that the spring constant of the bearing is larger than that of the topside, illustrating that the bearing is stable at the given design and condition.

Journal Bearing

Flow restrictions may also be used to form journal bearings that maintain the rotor disk in is proper alignment (side to side). Two potential locations for the journal bearings are considered: at the inner radius of the disk (center hole) or on its outer radius. The main difference is the state of the lubricating film: steam at the outer radius and liquid at the inner radius. Micro journal bearing experience to date is limited to gas lubricated bearing at the outer radius of 4 mm diameter rotors with 0.3 mm axial length, which have been demonstrated at high rotational speeds (up to 300 m/s tip speed). The operating principle consists of driving a portion of the exit turbine flow axially along the journal bearing gap, from the turbine-side of the rotor (5) to the backside (4), i.e., along the outside radius of the rotor disk. The axial pressure profile along the sidewall of the rotor is not necessarily linear due to inertial and entry losses, hence it depends on the local gap and Reynolds number. As the rotor moves off-center, the journal bearing gap becomes circumferentially non-uniform, inducing non-uniform pressure forces. Since smaller clearances result in lower inertial and entry losses, local pressure forces are higher that in the large clearance sections, yielding a net re-centering force. In order to minimize the development risks for the Rankine device, a similar configuration is designed herein. From previous experimentation with this type of low aspect ratio hydrostatic journal bearing, it was found that journal pressure differentials on the order of 5-30 kPa are required, which are significantly lower than pressures available in the system. Since the turbine exit pressure (location 5) is the lowest in the cycle, in certain embodiments it is advantageous to supply slightly pressurized steam to the backside (location 4) through internal piping (microchannels).

Seals

Sealing may be required to separate the high-pressure fluid from the low-pressure fluid and separate the liquid and steam streams. As illustrated in FIG. 31, seals are needed at two locations: on the top-side of the rotor and on the backside of the rotor. On the backside of the rotor, a seal may separate the pressurized liquid from entering the backside of the rotor, otherwise, viscous drag in the generator gap would overwhelm other forces on the rotor and drastically impact performance and efficiency. To minimize leakage, an outward flow pump is preferable since the pressure difference across the seal would only be the pressure drop across the evaporator. Two potential seal configurations are considered: a planar annular clearance or a herringbone spiral groove surface. Calculations suggest that the planar clearance with a gap of 1 micron or less would lead to negligible leakage flow rate, and that a patterned seal surface is not necessary. Such clearances are readily implemented and controlled in MEMS. It must be ensured however that the leakage flow evaporates when mixing with the superheated steam that flows over the backside of the disk. Alternatively, an inward flow pump could be considered, such that steam leaks into the pump, however leakage flow rate is significantly higher due to the high-pressure difference across the seal. In the embodiment shown in FIG. 35, the pressure at 1' is larger than at 2, so the liquid from the pump leaks to the bearing. In the case that the gap g between the seal and the bottom layer is 0.8 micron, the amount of leakage flow is 4% of the total mass flow of liquid in the pump, for the properties and dimensions referred to in the figure. This amount is not considered so much. But while going through the seal, the liquid can evaporate due to the hot wall temperature and low pressure at the bearing part. The vaporized flow can affect the function of the thrust bearing. Two alternate options are possible if this effect is significant: 1) a herringbone grooved-shaped seal can be etched in order to counteract the leakage flow; 2) the flow direction of the pump can be reserved, such that the low pressure pump inlet is located adjacent to the seal and reduced the pressure differential. Both approaches could provide significant reduction of leakage.

In certain embodiments, the top-side seal can consist of a herringbone spiral groove surface, that also serves as a forward thrust bearing. Its larger radial extend necessary for its bearing functions naturally leads to improved sealing, and is therefore less of a concern than the backside seal.

Generator

Although specific design studies have not been carried out for the Rankine device, such electromechanical technology is expected to be appropriate since the operating conditions and fabrications constraints are similar, and even more conservative, that the gas turbine applications these are currently being developed for. Specifically, magnetic materials are more likely to be applicable given the lower operating temperature in the Rankine cycle compared to the Brayton cycle. Also, the mechanical strength requirements of the rotor components are relaxed since the centrifugal loads are approximately one third that expected in the MIT micro gas turbine, based on design speeds. Based on analysis and experiments to date, power levels on the order of 1-3 W (per rotor) and electromechanical energy conversion efficiency on the order of 50% is expected for such micro-motors and generators.

System Performance

The system design task consists of defining the main geometric and operational design parameters, which include rotational speed, disk radius, mass flow, working fluid, and main cycle parameters (condenser temperature, pump exit pressure, and superheated temperature). The approach consists of a coupled power (or torque) balance about the rotor ($W_{turbine} = W_{pump} + W_{generator} + W_{losses}$) and a cycle analysis. The main design parameters are varied, searching for high power output and high efficiency regions within the design space. Over this design space, the detailed component design is optimized, within the limitations imposed by microfabrication and small scale.

The power balance on the rotor was performance for the baseline device with 5 Watt mechanical power output, produced by the five-stage turbine at the inlet condition of 0.6 MPa and 400° C. This power is partly consumed by the viscous pump, and lost by the viscous loss of seals and bearings. The rest is converted into electricity with the generator. The viscous losses include drag at the bottom of the disk (generator gap), the loss at the seals, the loss at the axial bearing restrictor, and the loss for an outer radius journal bearing. The tangential flow is assumed to be fully-developed (couette flow without a pressure gradient). Except for the seal loss, the other losses are calculated based on the condition of vapor at 0.6 Mpa and 400° C. And the seal loss is based on the condition of water right after pumping (0.6 Mpa and 120° C.). The size and geometry is based on the baseline design.

Figure 34:
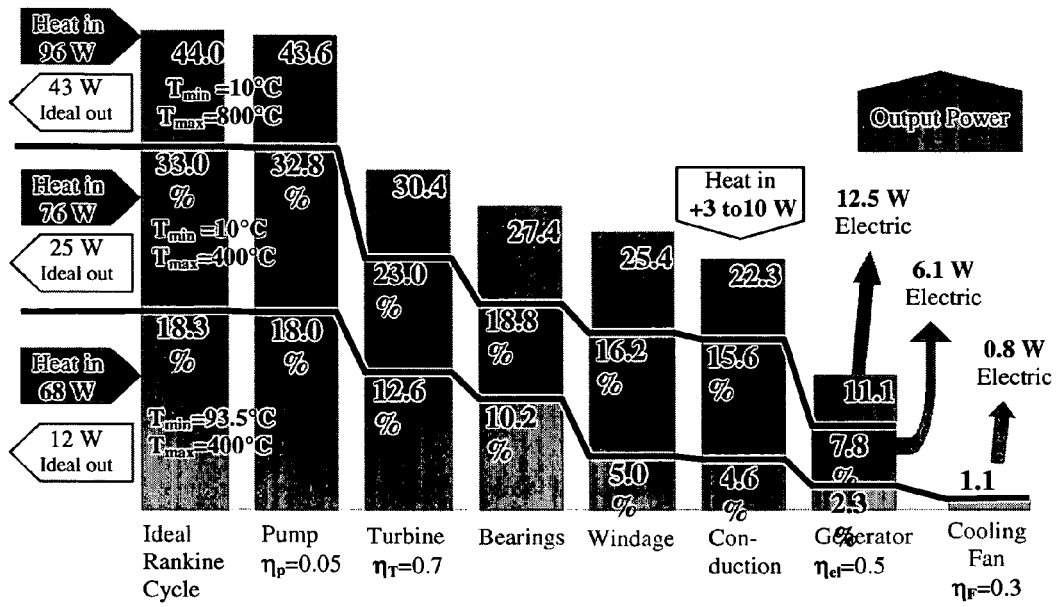
FIG. 34 shows the predicted performance of the micro steam turbine power plant-on-a-chip for the integrated and stand-alone configurations in accordance with some embodiments of the present invention.

Gross mechanical energy=Power from turbine=Power lost by viscous effect+Power for pump+Power consumed by a electromagnetic generator Power from turbine: 5 W
Power loss:
   1) Pump: 0.345 W
   2) Viscous loss: 1.044 W
      Loss at the bottom: 0.190
      Loss at the seal: 0.413
      Loss at the bearing: 0.108
      Loss at the Journal bearing: 0.333
Power delivered to generator: 3.611 W Non-optimized assessment of the system performance is however possible, for the nominal operating point and with component efficiencies based on these results and prior experience at MIT. The predicted performance for two application configurations are shown in FIG. 34 for a 1 cm$^2$×0.3 cm thick device with a water flow rate of 24 mg/s, maximum temperature of 400° C. and pump exit pressure of 0.6 MPa. The top bars represent the breakdown of power expenditure for a micro steam turbine power plant-on-a-chip rejecting heat to the atmosphere surrounding an aircraft at typical flight altitude. To prevent freezing of the working fluid, water in this calculation, the condenser temperature is kept above 10 C (using a working fluid with lower freezing point would allow a lower condenser temperature, higher efficiency, and increased output power). The output power is predicted to be on the order of 6 Watts for a total heat input near 80 Watts, corresponding to an energy conversion efficiency of 7-8% and a power density of over 6 kW/kg (assuming a device density of 3 g/cm$^3$, which is greater than that of silicon).

Also shown in FIG. 34 is the predicted performance of a similar device rejecting heat to 25° C. cabin air using an external heat exchanger and cooling fan. System optimization suggests a condenser temperature of 93.5° C., as a compromise between cycle power output and cooling fan power consumption. As a result, the ideal Rankine cycle efficiency suffers, lowering the output power to 0.8 W and the overall efficiency to 1%. Both of these scenarios have the potential to be improved through optimization of the rotation speed, bearing and seal configuration, turbomachinery design, cycle parameters and device configuration.

Higher temperatures can be achieved is the heat is supplied by an integrated combustion heat source as opposed to scavenging heat. FIG. 34 also includes the prediction for a micro Rankine device operating at a maximum superheated temperature of 800° C. (silicon becomes ductile and may creep above 900° C.) and in-flight conditions (10° C. minimum cycle temperature). Efficiencies up to 11% and power density of over 12 kW/kg are expected.

Thermal Management

At very small scales, it is difficult to thermally isolate hot structures from cold ones, so preventing heat leakage by conduction becomes critical. For the micro Rankine device, a low thermal resistance between the evaporator and condenser would result in direct conduction heat loss. This heat flux bypasses the cycle, producing no power, and requiring higher heat input (hot side) and removal (cold side). Calculations to date suggest that a silicon connection between both sides of the chip will offer too low of a thermal resistance, but that thin SiO$_2$ walls would offer sufficient isolation. A silicon-only device with the original configuration is therefore not viable due to excessive thermal conduction. Low conductivity layers between the evaporator and condenser and/or increased separation distance are necessary.

Two approaches are currently envisioned to create thick insulating layers:
1. Use of glass wafers as the layer surrounding the turbine rotor. Gross features (>200 microns) can also be formed via ultrasonic machining of glass or wet etching, common processes used for bioMEMS. Fine features can be formed using deep etching to tens of microns, as demonstrated for waveguides of optical MEMS (S.T. Systems, UK). Deep etches with relatively vertical walls have been demonstrated up to depths of 90 microns, although the etch rate is low (less than 1 micron/min).
2. Deposited thick film (>10 microns) into a deep trench. A deep trench is etched in the silicon wafer, 20 microns wide for example. A thick silicon dioxide layer is conformally deposited on the exposed surface, including the side walls of the trench. As the deposited thickness approaches 10 microns, the trench will fill and close off. After removing the top silicon dioxide layer through lapping and polishing, wet etching the remaining silicon will leave a 40 microns thick silicon dioxide wall. Thick PECVD oxides (TEOS) have been previously demonstrated by the inventors without cracks, even after high temperature annealing.

Analysis of stray heat loss is presented next for the proposed device layout, along with an alternate device layout that offers potential improvements in thermal isolation, described in the following section.

Figure 35:
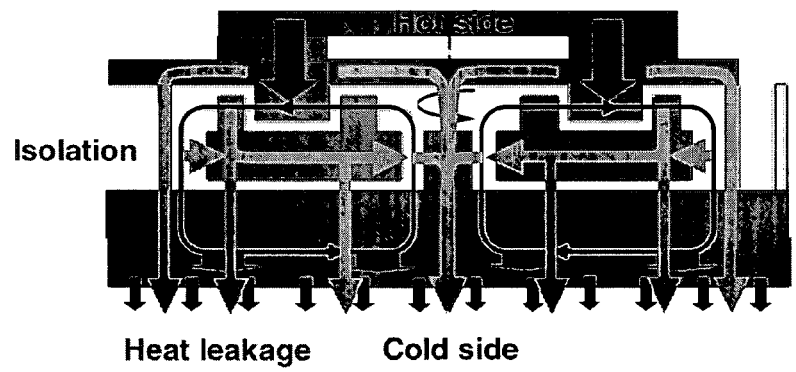
FIG. 35 shows the thermal leakage paths modeled as a resistance circuit in accordance with some embodiments of the present invention.

The structure surrounding the rotor must be designed to minimize thermal leakage between the evaporator and condenser. Such heat leakage effectively reduces the overall energy conversion efficiency since additional heat may be supplied without producing any power. A first order analysis was done to estimate the heat leakage through the structure, rotor, and thin fluid gaps. Various configurations of wall geometries have been considered, and the simplest one has been retained. It consists of a circular wall surrounding the rotor and a square along the outer edge of the chip. A vacuum is established between the two walls during wafer bonding to increase the thermal resistance. FIG. 35 illustrates the thermal conduction paths considered in this first order analysis in accordance with some embodiments of the present invention. It was found that the main path for heat leakage from the hot side to the cold side is the solid structure that encloses the rotor (i.e. the center layer). The center layer is also an integral part of the structure that encloses the working fluid, effectively forming a "high pressure vessel". There is therefore an intrinsic trade-off between the mechanical strength of the center layer and its thermal resistance.

Mechanical Integrity of the Thermal Insulation Layer

From a thermal resistance perspective, the center layer should consist of thin walls connecting the upper and lower portions of the device. These walls however have a minimum strength requirement in order to sustain the high pressure inside the turbine cavity. Two main modes of failure are considered: rupture of the walls surrounding the rotor from hoop stress induced by the internal pressure applied radially, and delamination of the center layer from the upper and lower layers due to the internal pressure which also applies an axial load. The strength to both of these loads would improve with increasing wall thickness, but to the expense of additional stray heat conduction.

Figure 36:
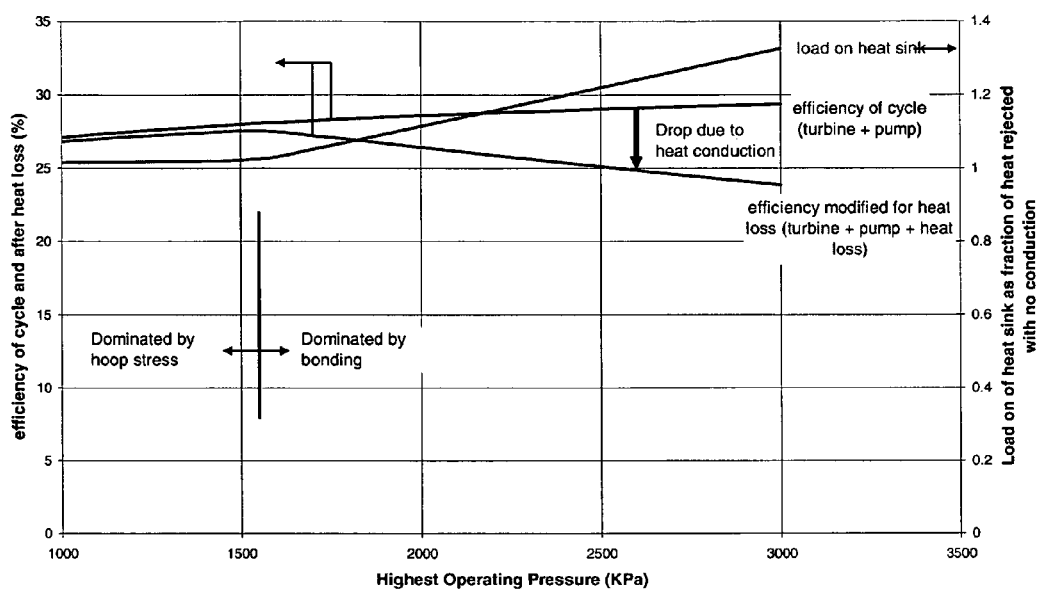
FIG. 36 shows the cycle efficiency and cooling load when accounting for conduction heat loss through the structure, shown as a function of maximum cycle pressure, in accordance with some embodiments of the present invention.

An analysis was performed to identify the impact of this trade-off and determine viable configurations for a range operating pressures and temperatures. The wall geometry considered consists of a square wall along the periphery of the chip and a second circular wall surrounding the rotor. A vacuum is created in the region between the two walls to reduce convection heat loss. The maximum cycle pressure is assumed to be applied over the entire area inside the circular wall. The approach consists of calculating the minimal wall thickness required to support the loads for a given maximum cycle pressure, and then calculate the heat loss through by conduction through the walls forming the center layer. For this study, the bond maximum strength was taken to be 1 MPa and the $SiO_2$ yield strength to be 8400 MPa. Two parameters are then of interest: the cycle efficiency and the cooling load. The cycle efficiency is directly reduced by the additional heat that may be supplied, but for which no additional work is extracted. Since this heat may be removed from the condenser side, it also incurs an additional cooling load, which could translate in higher condenser temperatures and lower cycle performance, depending on the application. Results of the analysis are shown in FIG. 36, illustrating that the efficiency drops due to heat loss, especially at high pressures where the bonding strength become limiting. This suggests that there is an optimum maximum cycle pressure beyond which additional stray heat conduction negates the natural increase in cycle efficiency due to higher pressures. For the case considered, this optimum pressure is approximately 1.6 MPa.

Figure 37:
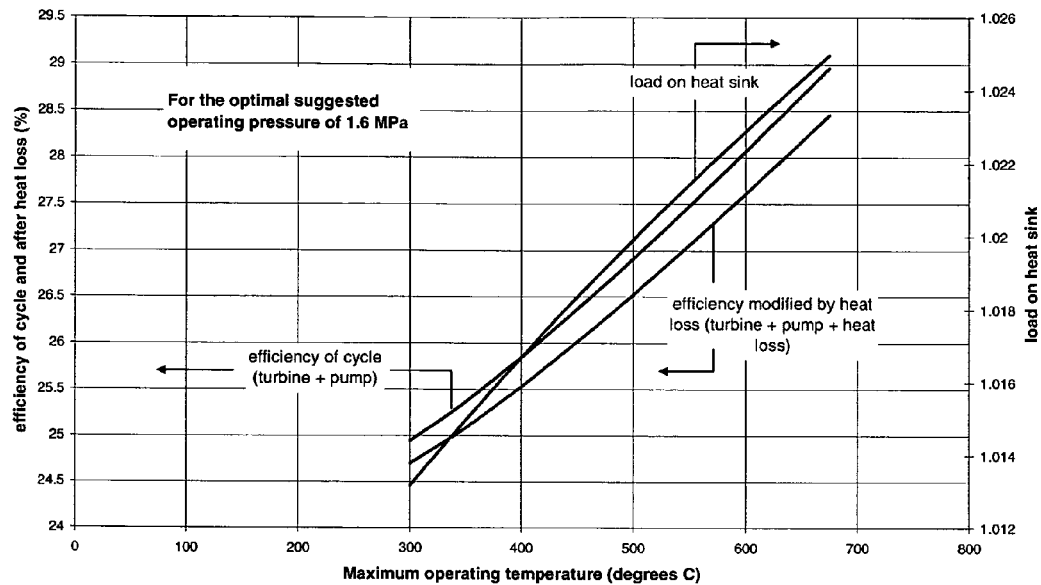
FIG. 37 shows the cycle efficiency and cooling load accounting for stray heat conduction, shown as a function of maximum cycle temperature for the optimal pressure, in accordance with some embodiments of the present invention.

At a given pressure, increasing the maximum cycle temperature also leads to higher cycle efficiency, but simultaneously higher heat flux by conduction. As illustrated by the results in FIG. 37, higher temperatures appear to benefit the overall efficiency; hence the highest temperature operation is desirable for efficiency.

Figure 38:
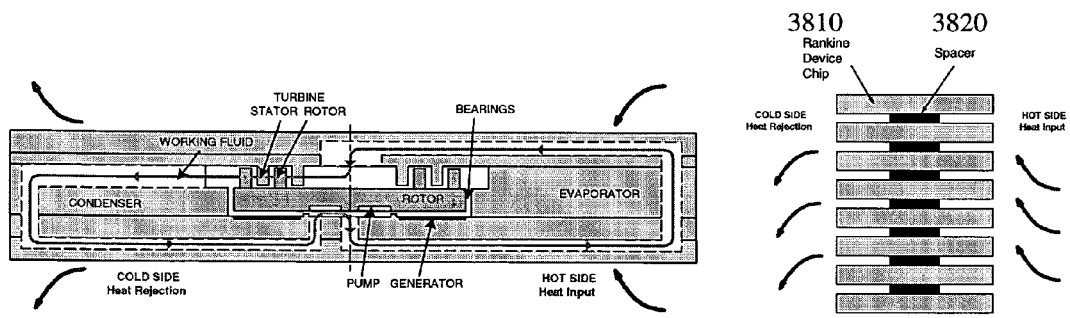
FIG. 38 is a simplified illustration of an alternate Rankine device layout with heat exchangers located on either side of the turbine and spacers stacked between the chips to create fin arrays for external heat transfer in accordance with some embodiments of the present invention.

Alternate Layout:

An alternate layout that potentially reduces conduction between the condenser and evaporator consists of locating the heat exchangers in the plane of the rotor, on either side of it, as illustrated in FIG. 38. The chips 3810 would then be stacked on top of each other with thin spacers 2830 in between, creating fin arrays out of the evaporator and condenser heat exchangers. The distance between the hot and cold components is increased and the area for external heat transfer is increased.

Efficient Microturbomachinery

Figure 39:
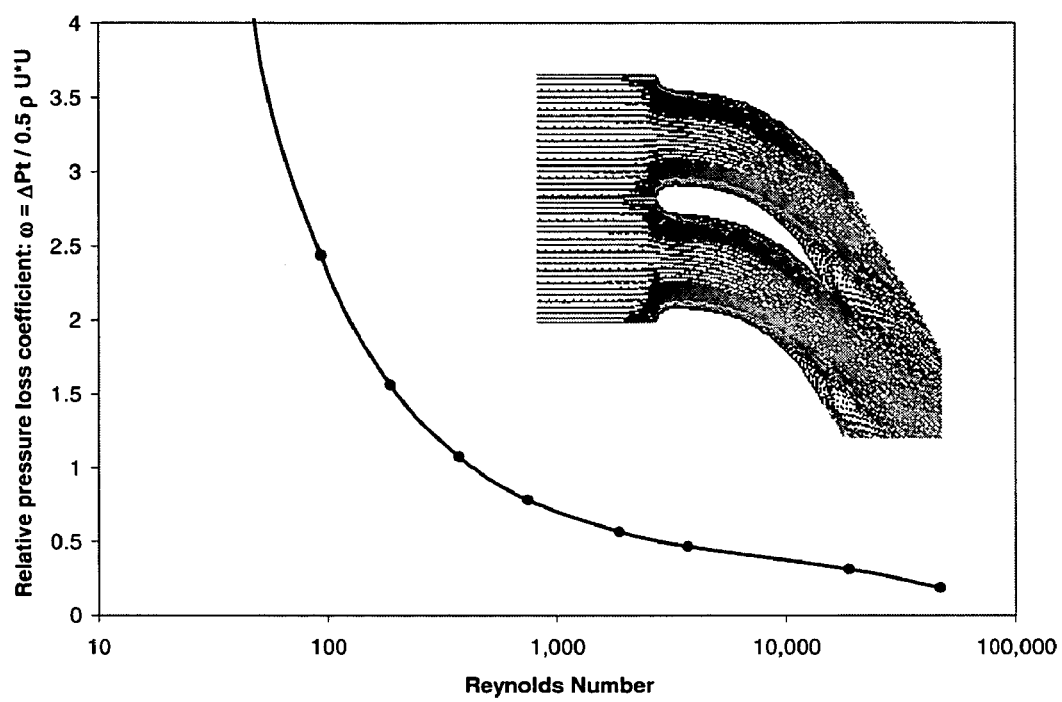
FIG. 39 shows the relative pressure loss coefficient as a function of scale, represented by the Reynolds number in accordance with some embodiments of the present invention.

Low Reynolds number regime in microturbomachinery (ranging from about 100 to 10,000) results in higher viscous losses and lower adiabatic efficiency that traditional turbomachinery. FIG. 39 illustrates this trend for a turbine vane by plotting the relative total pressure loss coefficient as a function of Reynolds number, calculated using a commercial CFD software (Fluent v6). The sharp increase in loss coefficient below Re~100 suggest a minimal practical scale for turbomachinery. Previous numerical investigations of low Reynolds number turbomachinery suggest that efficiency on the order of 70% is expected for millimeter-scale rotors. For the Rankine device, the turbine efficiency is critical since the overall system efficiency scales directly with it. Rotors may be operated at high speeds (100's m/s) and remain at millimeter scale diameters in order to maintain acceptable Reynolds number and limit the impact of viscous losses. From a system-level perspective, the device can be scaled by increasing the design flow rate. This would promote higher velocities and/or larger rotor diameters (hence potentially higher turbine efficiency), while requiring a larger chip area to accommodate the increased heat load.

Design Robustness

Finally, successful development of highly integrated systems, such as the micro Rankine device, requires acceptable operation of the components over a relatively wide range of off-design operating conditions. Manufacturing tolerances, simplified components models, and ill-defined two-phase flow physics are examples of potential sources of variability that can adversely affect a development program. Experimental and numerical work on the key components along with a design approach focused on robustness is therefore important. For example, the aerodynamic design of the multistage turbine should not experience drastic changes of loss and blockage when operating at off-incidences, to ensure acceptable operation if it is mismatched with the other components. Unfortunately, designing for robustness typically implies conservative operating conditions and consequently lower output power levels.

Due to the planar shape of the device, laying out arrays of power plant chips can form power-generating sheets. These sheets can be closely integrated with current and future airframes and propulsion systems, adapting to practically any form factor.

Due to the small size of each power-generating device, the technology is directly scalable for vehicles of all sizes (space, airborne, ground, underwater, etc.), from micro vehicles, to unmanned vehicles, to passenger transport. Increased power output is achieved by using more devices in parallel, covering larger areas. In addition, the devices can be distributed throughout the air vehicle, for local power generation and energy scavenging.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential feature or element of any or all the claims. As used herein, the terms "comprises," "comprising," or any other variation thereof, are intended to cover a non-exclusive inclusion, such that a process, method, article, or apparatus that comprises a list of elements includes not only those elements but may also include other elements not expressly listed or inherent to such process, method, article, or apparatus.

The following references are incorporated by reference herein in their entireties:

Epstein A. H. and Senturia S. D., 1997, "Macro Power from Micro Machinery", Science, 276, p. 1211.

Epstein, A. H., et al. 1997, "Micro-Heat Engines, Gas Turbines, and Rocket Engines —The MIT Microengine Project," AIAA Paper 97-1773, 28th AIAA Fluid Dynamics Conference, Snowmass Village.

Epstein A. H, Jacobson S. A., Protz J., Frechette L. G., 2000, "Shirtbutton-Sized Gas Turbines: The Engineering Challenges of Micro High Speed Rotating Machinery," Proc. 8th Int'l Symp. on Transport Phenomena and Dynamics of Rotating Machinery, Honolulu, Hi.

Isomura, K., Murayama, M., Yamaguchi, H., Ijichi, N., Asakura, H., Saji, N., Shiga, O., Takahashi, K., Tanaka, S., Genda, T., Esashi, M., 2002, "Development of Microturbocharger and Microcombustor for a Three-Dimensional Gas Turbine at Microscale," ASME IGTI 2002 TURBO EXPO, Paper GT-2002-30580, Amsterdam, Netherlands, June 6.

Fu, K., Knobloch, A. J., Martinez, F. C., Walther, D. C., Fernandez-Pello, C., Pisano, A. P. and Liepmann, D., 2001, "Design and Fabrication of a Silicon-Based MEMS Rotary Engine," Proc. ASME Int'l Mech. Eng. Congress and Expo., New York, November 11-16.

Toriyama, T., Hashimoto, K., Sugiyama, S., 2003, "Design of a Resonant Micro Reciprocating Engine for Power Generation," Proc. Transducers'03, Boston, Mass., June.

Richards, C. D., Bahr, D. F., Xu, C.-G., Richards, R. F., 2001, "The P3 Micro Power Generation System," Proc. ASME Int'l Mech. Eng. Congress and Expo., New York, November 11-16.

Santavicca, D., Sharp, K., Hemmer, J., Mayrides, B., Taylor, D., Weiss, J., 2003, "A Solid Piston Micro-engine for Portable Power Generation," Proc. ASME Int'l Mech. Eng. Congress and Expo., Washington, D.C., Nov. 16-21.

Schaevitz, S. B., Franz, A. J., Jensen, K. F. and Schmidt, M. A., 2001, "A Combustion-based MEMS Thermoelectric Power Generator," Proc. Transducers'01, Munich, Germany, June 10-14, pp. 30-33.

Sitzki, K. Borer, S. Wussow, E. Schuster, P. D. Ronney and Cohen, A., 2001, "Combustion in Microscale Heat Recirculating Burners," 39th AIAA Aerospace Sciences Meeting, Paper No. 2001-1087, Reno, Nev., January 8-11.

Zhang, C., Najafi, K., Bernal, L. P., Washabaugh, P. D., 2003, "Micro Combustion-Thermionic Power Generation: Feasibility, Design and Initial Results". Proc. Transducers'03, Boston, Mass., June.

Nielsen, O. M., Arana, L. R., Baertsch, C. D., Jensen, K. F., Schmidt, M. A., 2003, "A Thermophotovoltaic Micro-Generator for Portable Power Applications," Proc. Transducers'03, Boston, Mass., June.

Fréchette, L. G., Jacobson, S. A., Ehrich, F. F., Ghodssi, R., Khanna, R., Wong, C. W., Zhang, X., Schmidt, M. A., Epstein, A. H., 2000, "Demonstration of a Microfabricated High-Speed Turbine Supported on Gas Bearings," Tech. Digest, Solid-State Sensor and Actuator Workshop, Hilton Head Is., SC, pp. 43-47.

Mehra, A., Zhang, X., Ayón, A. A., Waitz, I. A., Schmidt, M. A., Spadaccini, C., 2000, "A Six-Wafer Combustion System for a Silicon Micro Gas Turbine Engine," J. Microelectromechanical Systems, vol. 9, no. 4, pp. 517-527.

London, A. P., Epstein, A. H., Kerrebrock, J. L., 2001, "High-Pressure Bipropellant Microrocket Engine," AIAA J. Propulsion and Power, vol. 17, no. 4, pp. 780-787.

Fréchette, L. G., Nagle, S. N., Ghodssi, R., Umans, S. D., Schmidt, M. A., Lang, J. H., 2001, "An Electrostatic Induction Micromotor Supported on Gas-Lubricated Bearings," Proc. 14th IEEE Int'l Conf. on Micro Electro Mechanical Systems, Interlaken Switzerland, January 21-25, pp. 290-293.

Kerrebrock, J. L., 1992, Aircraft engine and gas turbines, 2nd Ed., MIT Press, Cambridge, Mass.

Mehra, A., 1997, Computational Investigation and Design of Low Reynolds Number Micro-Turbomachinery. S. M. Thesis, Massachusetts Institute of Technology, Cambridge, Mass.

Muijderman, E. A., 1966, Spiral Groove Bearings, Springer-Verlag New York.

Sato, Y., Ono, K., and Iwama, I., 1990, "The Optimum Groove Geometry for Spiral Groove Viscous Pumps," ASME J. Lubrication Tech., vol. 112, no. 2, pp. 409-414.

Hsing, F. C., 1974, "Analytical Solutions for Incompressible Spiral Groove Viscous Pumps," ASME J. Lubrication Tech., vol. 96, no. 3, pp. 365-369.

Meuller, N., Fréchette, L. G., 2002, "Optimization and Design Guidelines for High Flux Micro-Channel Heat Sinks for Liquid And Gaseous Single-Phase Flow," Proc. 8th Intersociety Conf. on Thermal and Thermomech. Phenomena in Elec. Systems (ITherm2002), San Diego, June.

Mudawar I., 2001, "Assessment of high-heat-flux thermal management schemes," IEEE Trans. on Components and Packaging Tech., vol. 24, no. 2, June, pp. 122-141.

Koo J. M., et al., 2001, "Modeling of two-phase microchannel heat sinks for VLSI chips," Proc. 14th IEEE Int'l Conf. on Micro Electro Mechanical Systems, Interlaken Switzerland, January 21-25, pp. 422-426.

Zhang L., et al., 2001, "Study of boiling regimes and transient signal measurements in microchannels," 11th International Conference on Solid-State Sensors and Actuators, Munich, Germany, June 10-14.

Nagle, S. F., 2000, Analysis, Design, and Fabrication of an Electric Induction Micromotor for a Micro Gas-Turbine Generator. Ph.D. Thesis, Massachusetts Institute of Technology, October.

Koser, H., Cros, F., Allen, M. G., Lang, J. H., 2001, "A High Torque Density Magnetic Induction Machine," Proc. 11th International Conf. on Solid-State Sensors and Actuators (Transducers), Munich, Germany, June, pp. 284-287.

Cheng, Y. T., Lin, L., Najafi, K., 2000, "Localized Silicon Fusion and Eutectic Bonding for MEMS Fabrication and Packaging," J. Microelectromech. Systems, vol. 9, no. 1.

What is claimed is:

1. A multi-stage microfabricated steam turbine engine comprising:
    a rotatable, disk-shaped rotor having a plurality of concentric rows of rotor blades disposed on a planar surface of the disk-shaped rotor;
    a stator having a planar surface facing and parallel to the planar surface of the disk-shaped rotor, the stator further having a plurality of concentric rows of stator blades disposed on the planar surface of the stator, wherein the plurality of concentric rows of stator blades are interdigitated with the plurality of concentric rows of rotor blades to form a multi-stage turbine;
    a pump for pumping a working fluid through the engine, wherein the pump is integrated into the disk-shaped rotor and wherein the pump is driven by the turbine;
    a generator system driven by the turbine to convert mechanical energy into electrical energy;
    an evaporator system for heating the working fluid;
    a condenser system for cooling the working fluid;
    an axial bearing for maintaining an axial position of the disk-shaped rotor, the axial bearing comprising at least one flow restriction that is located near a portion of the disk-shaped rotor and wherein a portion of the working fluid in a high-pressure steam state is directed between the at least one flow restriction and the disk-shaped rotor; and
    a journal bearing for maintaining a lateral position of the disk-shaped rotor, the journal bearing comprising a second at least one flow restriction that is located near another portion of the disk-shaped rotor and wherein a portion of the working fluid is directed between the second at least one flow restriction and the disk-shaped rotor.

2. The device of claim 1, wherein the pump is a spiral groove viscous pump.

3. The device of claim 2, wherein the spiral groove viscous pump is located radially inward from an exit end of the condenser system.

4. The device of claim 2, wherein the spiral groove viscous pump is located radially outward from an exit end of the condenser system.

5. The device of claim 1, wherein the evaporator system comprising one of a plurality of microchannels or porous media that are arranged normal to the engine.

6. The device of claim 1, wherein the evaporator system comprising one of a plurality of microchannels or porous media that are arranged in a serpentine layout.

7. The device of claim 1, wherein the evaporator system comprises one of a plurality of microchannels or porous media that are arranged radially outward from the disk-shaped rotor.

8. The device of claim 1, wherein the condenser system comprises one of a plurality of microchannels or porous media that are arranged radially outward from the disk-shaped rotor.

9. The device of claim 1, wherein the condenser system comprises one of a plurality of microchannels or porous media that are arranged normal to the engine.

10. The device of claim 1, wherein the condenser system comprises one of a plurality of microchannels or porous media that are arranged in a serpentine layout.

11. The device of claim 1, wherein the working fluid is water.

12. The device of claim 1, further comprising a heat generation source, wherein the heat generation source is coupled to the evaporator system to provide heat energy to the working fluid that is contained within the evaporator system.

13. The device of claim 1, wherein the evaporator system absorbs heat from an ambient environment.

14. The device of claim 1, further comprising a cooling source, wherein said cooling source is coupled to the condenser system and wherein the cooling source cools the working fluid that is contained within the condenser system.

15. The device of claim 1, wherein working fluid contained within the condenser system is cooled due to the presence of an ambient environment.

16. The device of claim 1, wherein the pump is inboard of the generator.

17. A method for making a multi-stage microfabricated steam turbine engine, the method comprising:
forming a rotatable, disk-shaped rotor having a plurality of concentric rows of rotor blades disposed on a planar surface of the disk-shaped rotor on a first substrate;
forming a pump in the disk-shaped rotor;
forming a stator having a planar surface facing and parallel to the planar surface of the disk-shaped rotor, the stator further having a plurality of concentric rows of stator blades disposed on the planar surface of the stator on a second substrate;
bonding the first substrate and the second substrate together such that the plurality of concentric rows of stator blades are interdigitated with the plurality of concentric rows of rotor blades to form a multi-stage turbine; and
forming a plurality of microchannels for transporting a working fluid through the an evaporator system for heating the working fluid and a condenser system for cooling the working fluid, wherein the working fluid expands through the turbine to drive the pump and an integrated generator.

18. The method of claim 17, wherein the first substrate is one of a silicon substrate, a silica substrate, a ceramic substrate, and a silicon-on-insulator substrate.

19. The method of claim 17, wherein the second substrate is one of a silicon substrate, a silica substrate, a ceramic substrate, and a silicon-on-insulator substrate.

20. The method of claim 17, wherein the rotor blades are formed using deep reactive ion etching.

21. The method of claim 17, wherein the stator blades are formed using deep reactive ion etching.

22. The method of claim 17, wherein the stator blades are formed on a silicon-on-insulator substrate by etching the stator blades down to the insulator layer, the method further comprising exposing the insulator layer by wet etching the insulator layer.

23. The method of claim 17, further comprising bonding the first substrate and the second substrate to a thermal isolation layer to enclose the rotor.

24. The method of claim 17, wherein the working fluid is water.

25. A multi-stage steam turbine power plant micromachine comprising:
a rotatable, disk-shaped rotor having a plurality of concentric rows of rotor blades disposed on a planar surface of the disk-shaped rotor;
a stator having a planar surface facing and parallel to the planar surface of the disk-shaped rotor, the planar stator further having a plurality of concentric rows of stator blades disposed on the planar surface of the stator, wherein the plurality of concentric rows of stator blades are interdigitated with the plurality of concentric rows of rotor blades to form a multi-stage turbine;
a pump for pumping a working fluid through the engine, wherein the pump is integrated into the backside of the disk-shaped rotor and wherein the pump is driven by the turbine;
a generator driven by the turbine to convert mechanical energy generated by the turbine into electrical energy; and
a plurality of microchannels integrated with the turbine for transporting the working fluid through an evaporator and a condenser, wherein the working fluid expands through the turbine to drive the pump and the generator.

26. The device of claim 25, wherein the pump is a spiral groove viscous pump.

27. The device of claim 26, wherein the spiral groove viscous pump is located radially inward from an exit end of the condenser.

28. The device of claim 26, wherein the spiral groove viscous pump is located radially outward from an exit end of the condenser.

29. The device of claim 25, wherein the evaporator comprises one of a plurality of microchannels or porous media that are arranged radially outward from the disk-shaped rotor.

30. The device of claim 25, wherein the evaporator comprises one of a plurality of microchannels or porous media that are arranged normal to the micromachine.

31. The device of claim 25, wherein the evaporator comprises one of a plurality of microchannels or porous media that are arranged in a serpentine layout.

32. The device of claim 25, wherein the condenser comprises one of a plurality of microchannels or porous media that are arranged radially outward from the disk-shaped rotor.

33. The device of claim 25, wherein the condenser comprises one of a plurality of microchannels or porous media that are arranged normal to the micromachine.

34. The device of claim 25, wherein the condenser comprises one of a plurality of microchannels or porous media that are arranged in a serpentine layout.

35. The device of claim 25, wherein the working fluid is water.

36. The device of claim 25, further comprising a heat generation source, wherein the heat generation source is coupled to the evaporator to provide heat energy to the working fluid that is contained within the evaporator.

37. The device of claim 25, wherein the evaporator absorbs heat from an ambient environment.

38. The device of claim 25, further comprising a cooling source, wherein the cooling source is coupled to the condenser and wherein the cooling source cools the working fluid that is contained within the condenser.

39. The device of claim 25, wherein working fluid contained within the condenser is cooled due to the presence of an ambient environment.

40. The device of claim 25, wherein the pump is inboard of the generator.

41. The device of claim 25, further comprising an axial bearing for maintaining an axial position of the disk-shaped rotor and a journal bearing for maintaining a lateral position of the disk-shaped rotor.

* * * * *